US011671980B2

(12) United States Patent
Taherzadeh Boroujeni et al.

(10) Patent No.: US 11,671,980 B2
(45) Date of Patent: Jun. 6, 2023

(54) TECHNIQUES FOR ENHANCED COVERAGE SEMI-PERSISTENT SCHEDULING

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US); Jing Sun, San Diego, CA (US); Peter Gaal, San Diego, CA (US); Junyi Li, Franklin Park, NJ (US); Juan Montojo, San Diego, CA (US); Jelena Damnjanovic, Del Mar, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 17/234,128

(22) Filed: Apr. 19, 2021

(65) Prior Publication Data

US 2021/0352701 A1 Nov. 11, 2021

Related U.S. Application Data

(60) Provisional application No. 63/022,003, filed on May 8, 2020.

(51) Int. Cl.
*H04W 72/23* (2023.01)
*H04W 72/121* (2023.01)
(Continued)

(52) U.S. Cl.
CPC ............. *H04W 72/23* (2023.01); *H04L 5/005* (2013.01); *H04L 5/0051* (2013.01);
(Continued)

(58) Field of Classification Search
CPC .......... H04W 72/1289; H04W 72/042; H04W 72/121; H04W 72/1273; H04W 16/24;
(Continued)

(56) References Cited

U.S. PATENT DOCUMENTS

2016/0353440 A1* 12/2016 Lee ........................ H04W 52/48
2017/0026942 A1   1/2017 Vajapeyam et al.
(Continued)

FOREIGN PATENT DOCUMENTS

WO   WO-2019053291 A1    3/2019
WO   WO-2021127021 A1 *  6/2021

OTHER PUBLICATIONS

International Search Report and Written Opinion—PCT/US2021/028183—ISAEPO—dated Aug. 9, 2021.

*Primary Examiner* — Joshua Kading
(74) *Attorney, Agent, or Firm* — Dalei Dong; Holland & Hart LLP

(57) ABSTRACT

Methods, systems, and devices for wireless communications are described. A user equipment (UE) may monitor a unicast channel for a first downlink transmission from a base station using a first semi-persistent scheduling (SPS) configuration. The UE may receive downlink control information (DCI) from the base station indicating a second SPS configuration associated with a different coverage level than the first SPS configuration. In some cases, the DCI may be DCI that is common to a set of UEs. Here, the DCI may indicate the second SPS configuration and the UE may identify a set of parameters associated with the second SPS configuration based on a radio resource control (RRC) message received prior to the DCI. Based on receiving the indication of the second SPS configuration, the UE may monitor the unicast channel for a second downlink transmission from the base station using the second SPS configuration.

28 Claims, 15 Drawing Sheets

(51) Int. Cl.
*H04W 24/02* (2009.01)
*H04W 72/1273* (2023.01)
*H04L 5/00* (2006.01)
*H04W 16/26* (2009.01)
*H04W 36/20* (2009.01)

(52) U.S. Cl.
CPC ........... *H04W 16/26* (2013.01); *H04W 24/02* (2013.01); *H04W 36/20* (2013.01); *H04W 72/121* (2013.01); *H04W 72/1273* (2013.01)

(58) Field of Classification Search
CPC . H04W 16/26; H04W 24/02; H04W 36/0083; H04W 36/165; H04W 36/20; H04L 5/005; H04L 5/0048; H04L 5/0051; H04L 27/261; H04L 27/2611; H04B 7/2606
See application file for complete search history.

(56) References Cited

U.S. PATENT DOCUMENTS

| | | | |
|---|---|---|---|
| 2017/0079064 A1* | 3/2017 | Yang | H04W 74/0833 |
| 2017/0289733 A1* | 10/2017 | Rajagopal | H04L 5/0087 |
| 2018/0049229 A1* | 2/2018 | Dinan | H04L 1/1896 |
| 2018/0279274 A1 | 9/2018 | Sun et al. | |
| 2021/0160879 A1* | 5/2021 | Lin | H04L 1/1854 |
| 2021/0219329 A1* | 7/2021 | Zhou | H04L 1/1819 |
| 2021/0227570 A1* | 7/2021 | Park | H04W 76/27 |
| 2022/0173863 A1* | 6/2022 | Han | H04L 5/0094 |

* cited by examiner

TECHNIQUES FOR ENHANCED COVERAGE SEMI-PERSISTENT SCHEDULING

CROSS REFERENCE

The present application for patent claims the benefit of U.S. Provisional Patent Application No. 63/022,003 by TAHERZADEH BOROUJENI et al., entitled "TECHNIQUES FOR ENHANCED COVERAGE SEMI-PERSISTENT SCHEDULING," filed May 8, 2020, assigned to the assignee hereof, which is hereby incorporated by reference in its entirety.

FIELD OF DISCLOSURE

The following relates to wireless communications and more specifically to techniques for enhanced coverage semi-persistent scheduling (SPS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a narrow unicast beam (or a set of adjacent narrow unicast beams) may become weak or suffer from partial shadowing. The deterioration of narrow unicast beams may affect multiple UEs. In these cases, a level of performance is maintained for the wireless communications carried out over the weak or deteriorating unicast beams despite the negative effects on the unicast beams. In order to address these issues, coverage enhancement is implemented at the UEs to maintain sufficient performance over the unicast beams during the procedure for changing to different unicast beams. However, in cases where unicast beams associated with multiple UEs are negatively affected, communications required to enable the coverage enhancement may result in excessive resource and signaling overhead.

SUMMARY

The described techniques relate to improved methods, systems, devices, and apparatuses that support techniques for enhanced coverage semi-persistent scheduling (SPS). For example, the described techniques provide for indicating a coverage-enhanced (e.g., secondary) SPS configuration to a set of UEs via a common downlink control information (DCI) (e.g., group common-DCI (GC-DCI)) in order to improve the performance of communications carried out over a unicast beam (or a set of unicast beams) between the UEs and a base station. For example, the secondary SPS configuration may include more resources for downlink transmissions (e.g., additional time/frequency resources, additional transmission repetitions, etc.). Thus, downlink transmissions sent and received via the secondary SPS configuration may be associated with higher reliability than downlink transmissions sent and received via the default SPS configuration. In some aspects, a primary SPS configuration (e.g., default SPS configuration) and the secondary SPS configuration (e.g., coverage-enhanced SPS configuration) may be previously configured for the set of UEs, such as through radio resource control (RRC) signaling. By sending a single common DCI (e.g., GC-DCI) to the set of UEs, the techniques described herein may improve the efficiency and reliability of wireless communications, and may decrease the control signaling overhead necessary to utilize the secondary SPS configuration when compared to sending separate DCI transmissions to each UE.

A method of wireless communication at a UE is described. The method may include monitoring a unicast channel using a first SPS configuration for a first downlink transmission from a base station, where the first SPS configuration includes a first set of parameters associated with a first coverage level, receiving DCI that is common for a set of UEs, the DCI indicating a second SPS configuration different from the first SPS configuration, the second SPS configuration including a second set of parameters associated with a second coverage level of the unicast channel, the second coverage level being different from the first coverage level, and monitoring the unicast channel for a second downlink transmission from the base station using the second SPS configuration including the second set of parameters associated with the second coverage level.

An apparatus for wireless communication at a UE is described. The apparatus may include a processor, memory coupled with the processor, and instructions stored in the memory. The instructions may be executable by the processor to cause the apparatus to monitor a unicast channel using a first SPS configuration for a first downlink transmission from a base station, where the first SPS configuration includes a first set of parameters associated with a first coverage level, receive DCI that is common for a set of UEs, the DCI indicating a second SPS configuration different from the first SPS configuration, the second SPS configuration including a second set of parameters associated with a second coverage level of the unicast channel, the second coverage level being different from the first coverage level, and monitor the unicast channel for a second downlink transmission from the base station using the second SPS configuration including the second set of parameters associated with the second coverage level.

Another apparatus for wireless communication at a UE is described. The apparatus may include means for monitoring a unicast channel using a first SPS configuration for a first downlink transmission from a base station, where the first SPS configuration includes a first set of parameters associated with a first coverage level, receiving DCI that is common for a set of UEs, the DCI indicating a second SPS configuration different from the first SPS configuration, the second SPS configuration including a second set of parameters associated with a second coverage level of the unicast channel, the second coverage level being different from the first coverage level, and monitoring the unicast channel for a second downlink transmission from the base station using the second SPS configuration including the second set of parameters associated with the second coverage level.

A non-transitory computer-readable medium storing code for wireless communication at a UE is described. The code may include instructions executable by a processor to monitor a unicast channel using a first SPS configuration for a first downlink transmission from a base station, where the first SPS configuration includes a first set of parameters associated with a first coverage level, receive DCI that is common for a set of UEs, the DCI indicating a second SPS configuration different from the first SPS configuration, the second SPS configuration including a second set of parameters associated with a second coverage level of the unicast channel, the second coverage level being different from the first coverage level, and monitor the unicast channel for a second downlink transmission from the base station using the second SPS configuration including the second set of parameters associated with the second coverage level.

Some examples of the method, apparatuses, and non-transitory computer-readable medium described herein may further include operations, features, means, or instructions for receiving, from the base station, a RRC message including an indication of the second set of parameters associated with the second SPS configuration, where monitoring the unicast channel using the second set of SPS configuration may be based on receiving the RRC message.

Some cases of the method, apparatuses, and non-transitory computer-readable medium described herein may further include operations, features, means, or instructions for identifying the second SPS configuration based on receiving the DCI and the RRC message, where monitoring the unicast channel according to the second SPS configuration may be based on receiving the RRC message.

In some instances of the method, apparatuses, and non-transitory computer-readable medium described herein, the second set of parameters include a quantity of repetitions of the second downlink transmission, a set of time resources, a set of frequency resources, or a combination thereof.

In some examples of the method, apparatuses, and non-transitory computer-readable medium described herein, monitoring the unicast channel using the first SPS configuration may include operations, features, means, or instructions for monitoring for a first quantity of repetitions of the first downlink transmission, and monitoring the unicast channel using the second SPS configuration may include operations, features, means, or instructions for monitoring for a second quantity of repetitions of the second downlink transmission, the second quantity of repetitions being greater than the first quantity of repetitions.

In some cases of the method, apparatuses, and non-transitory computer-readable medium described herein, monitoring the unicast channel using the first SPS configuration may include operations, features, means, or instructions for monitoring a first set of resources of the unicast channel for the first downlink transmission, and monitoring the unicast channel using the second SPS configuration may include operations, features, means, or instructions for monitoring a second set of resources of the unicast channel for the first downlink transmission, where the second set of resources may be different from the first set of resources.

In some instances of the method, apparatuses, and non-transitory computer-readable medium described herein, the second set of resources includes more time resources than the first set of resources, more frequency resources than the first set of resources, or a combination thereof.

In some examples of the method, apparatuses, and non-transitory computer-readable medium described herein, the second set of resources includes at least the first set of resources.

Some cases of the method, apparatuses, and non-transitory computer-readable medium described herein may further include operations, features, means, or instructions for transmitting, to the base station via a set of resources, a feedback message indicating whether a decoding of the second downlink transmission may be successful based on monitoring the unicast channel at the second coverage level associated with the second SPS configuration.

Some instances of the method, apparatuses, and non-transitory computer-readable medium described herein may further include operations, features, means, or instructions for identifying the set of resources based on an indication within the DCI, where transmitting the feedback message may be based on identifying the set of resources.

Some examples of the method, apparatuses, and non-transitory computer-readable medium described herein may further include operations, features, means, or instructions for receiving, from the base station, a RRC message indicating the set of resources, where transmitting the feedback message may be based on receiving the RRC message.

Some cases of the method, apparatuses, and non-transitory computer-readable medium described herein may further include operations, features, means, or instructions for identifying the set of resources based on a last repetition of the second downlink transmission, where transmitting the feedback message may be based on identifying the set of resources.

In some instances of the method, apparatuses, and non-transitory computer-readable medium described herein, the DCI includes the second set of parameters associated with the second SPS configuration, and monitoring the unicast channel using the second SPS configuration may be based on the DCI including the second set of parameters.

In some examples of the method, apparatuses, and non-transitory computer-readable medium described herein, monitoring the unicast channel for the second downlink transmission may include operations, features, means, or instructions for monitoring the unicast channel using the first SPS configuration.

Some cases of the method, apparatuses, and non-transitory computer-readable medium described herein may further include operations, features, means, or instructions for attempting to decode the second downlink transmission based on monitoring the unicast channel using the first SPS configuration, and attempting to decode the second downlink transmission based on monitoring the unicast channel using the second SPS configuration.

Some instances of the method, apparatuses, and non-transitory computer-readable medium described herein may further include operations, features, means, or instructions for receiving the second downlink transmission based on monitoring the unicast channel using the second SPS configuration.

In some examples of the method, apparatuses, and non-transitory computer-readable medium described herein, the DCI includes a GC-DCI.

A method of wireless communication at a base station is described. The method may include transmitting, via a unicast channel, a first downlink transmission to a UE using a first SPS configuration, transmitting, to a set of UEs including the UE, DCI that is common to the set of UEs, the DCI indicating a second SPS configuration different from the first SPS configuration, and transmitting, via the unicast channel, a second downlink transmission to the UE according to the second SPS configuration.

An apparatus for wireless communication at a base station is described. The apparatus may include a processor, memory coupled with the processor, and instructions stored in the memory. The instructions may be executable by the processor to cause the apparatus to transmit, via a unicast channel, a first downlink transmission to a UE using a first SPS configuration, transmit, to a set of UEs including the UE, DCI that is common to the set of UEs, the DCI indicating a second SPS configuration different from the first SPS configuration, and transmit, via the unicast channel, a second downlink transmission to the UE according to the second SPS configuration.

Another apparatus for wireless communication at a base station is described. The apparatus may include means for transmitting, via a unicast channel, a first downlink transmission to a UE using a first SPS configuration, transmitting, to a set of UEs including the UE, DCI that is common to the set of UEs, the DCI indicating a second SPS configuration different from the first SPS configuration, and transmitting, via the unicast channel, a second downlink transmission to the UE according to the second SPS configuration.

A non-transitory computer-readable medium storing code for wireless communication at a base station is described. The code may include instructions executable by a processor to transmit, via a unicast channel, a first downlink transmission to a UE using a first SPS configuration, transmit, to a set of UEs including the UE, DCI that is common to the set of UEs, the DCI indicating a second SPS configuration different from the first SPS configuration, and transmit, via the unicast channel, a second downlink transmission to the UE according to the second SPS configuration.

Some examples of the method, apparatuses, and non-transitory computer-readable medium described herein may further include operations, features, means, or instructions for transmitting, to the UE, a RRC message including an indication of one or more parameters associated with the second SPS configuration, where transmitting the first downlink transmission according to the first SPS configuration may be based on receiving the RRC message.

In some cases of the method, apparatuses, and non-transitory computer-readable medium described herein, the one or more parameters include a quantity of repetitions of the second downlink transmission, a set of time resources, a set of frequency resources, or a combination thereof.

Some instances of the method, apparatuses, and non-transitory computer-readable medium described herein may further include operations, features, means, or instructions for indicating the second SPS configuration to the UE based on transmitting the DCI and the RRC message, where transmitting the second downlink transmission to the UE according to the second SPS configuration may be based on indicating the second SPS configuration to the UE.

Some examples of the method, apparatuses, and non-transitory computer-readable medium described herein may further include operations, features, means, or instructions for transmitting the first downlink transmission to the UE according to the first SPS configuration includes transmitting a first quantity of repetitions of the first downlink transmission, and transmitting the second downlink transmission to the UE according to the second SPS configuration includes transmitting a second quantity of repetitions of the second downlink transmission greater than the first quantity of repetitions.

Some cases of the method, apparatuses, and non-transitory computer-readable medium described herein may further include operations, features, means, or instructions for transmitting the first downlink transmission to the UE according to the first SPS configuration includes transmitting the first downlink transmission via a first set of resources of the unicast channel, and transmitting the second downlink transmission to the UE according to the second SPS configuration includes transmitting the second downlink transmission via a second set of resources of the unicast channel different than the first set of resources.

In some instances of the method, apparatuses, and non-transitory computer-readable medium described herein, the second set of resources includes more time resources than the first set of resources, more frequency resources than the first set of resources, or both.

In some examples of the method, apparatuses, and non-transitory computer-readable medium described herein, the second set of resources includes at least the first set of resources.

Some cases of the method, apparatuses, and non-transitory computer-readable medium described herein may further include operations, features, means, or instructions for receiving, from the UE via a set of resources, a feedback message indicating whether a decoding of the second downlink transmission may be successful based on transmitting the second downlink transmission to the UE.

Some instances of the method, apparatuses, and non-transitory computer-readable medium described herein may further include operations, features, means, or instructions for indicating, to the UE, the set of resources associated with the feedback message by the DCI, where receiving the feedback message may be based on indicating the set of resources to the UE.

Some examples of the method, apparatuses, and non-transitory computer-readable medium described herein may further include operations, features, means, or instructions for transmitting, to the UE, a RRC message indicating the set of resources, where receiving the feedback message may be based on indicating the set of resources to the UE.

Some cases of the method, apparatuses, and non-transitory computer-readable medium described herein may further include operations, features, means, or instructions for indicating, to the UE, the set of resources associated with the feedback message based on transmitting a last repetition of the second downlink transmission, where receiving the feedback message may be based on indicating the set of resources to the UE.

In some instances of the method, apparatuses, and non-transitory computer-readable medium described herein, the DCI includes one or more parameters associated with the second SPS configuration, and transmitting the second downlink transmission according to the second SPS configuration may be based on the DCI including the one or more parameters.

In some examples of the method, apparatuses, and non-transitory computer-readable medium described herein, transmitting the DCI to the set of UEs may include operations, features, means, or instructions for transmitting GC-DCI to the set of UEs, where the GC-DCI indicates a set of second SPS configurations unique to each UE within the set of UEs.

DETAILED DESCRIPTION

Figure 1:
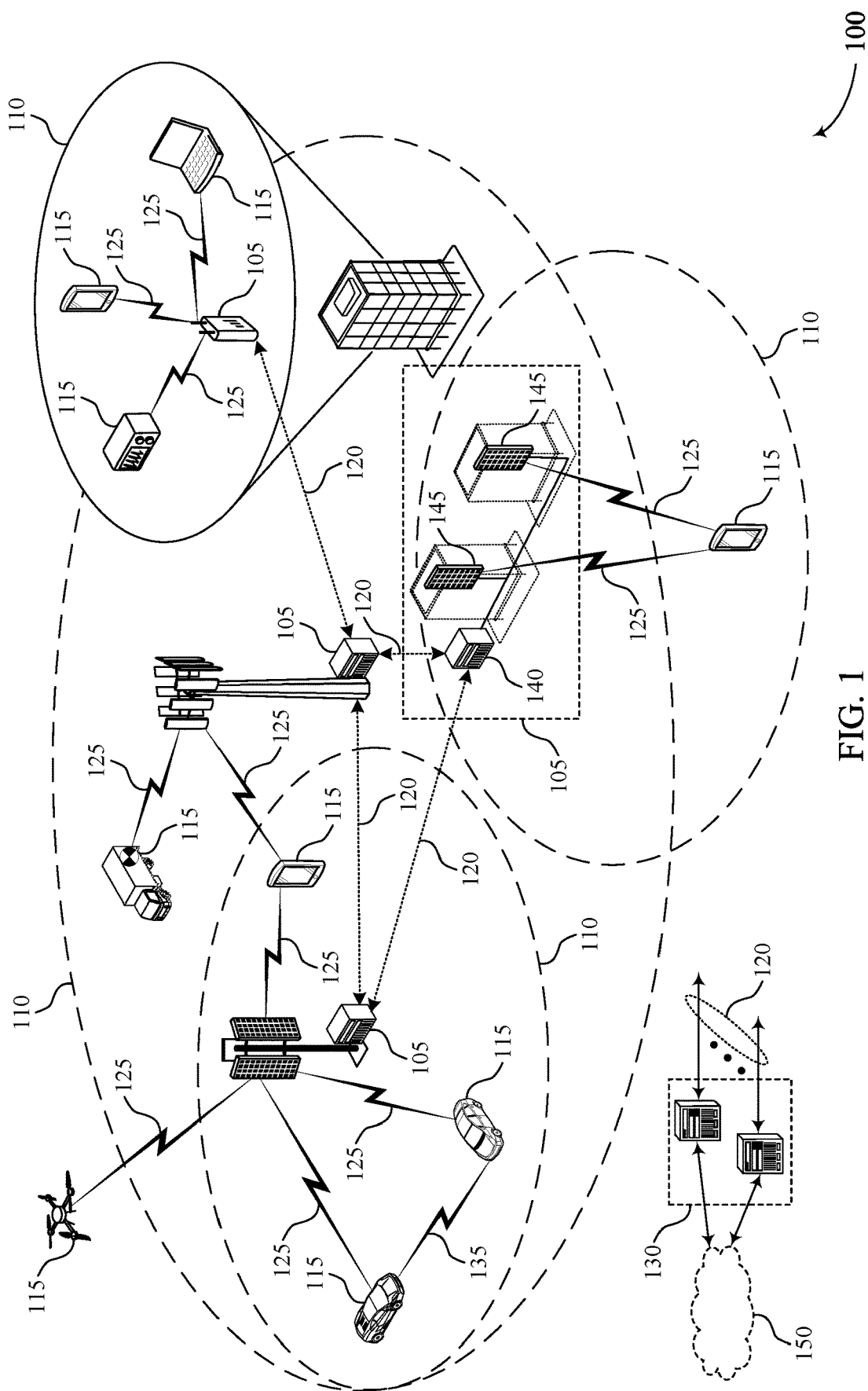
FIG. 1 illustrates an example of a wireless communications system that supports techniques for enhanced coverage semi-persistent scheduling (SPS) in accordance with aspects of the present disclosure.

In some wireless communications systems, a narrow unicast beam (or a set of adjacent narrow unicast beams) may become weak or suffer from partial shadowing. The deterioration of narrow unicast beams may affect multiple UEs. For example, a bus passing between a base station (e.g., an eNB) and a group of UEs may negatively affect the performance of unicast beams between the base station and the group of UEs. In these cases, a level of performance should be maintained for the wireless communications carried out over the weak or deteriorating unicast beams despite the negative effects on the unicast beams. In order to address these issues, coverage enhancement is implemented at the UEs to maintain sufficient performance over the unicast beams during the procedure for changing to different unicast beams. In cases where unicast beams associated with multiple UEs are negatively affected, communications required to enable the coverage enhancement may result in excessive resource and signaling overhead.

To address the performance issues in unicast beams, a UE may be configured to receive downlink transmissions via a primary semi-persistent scheduling (SPS) configuration (e.g., a default SPS configuration) or a coverage-enhanced SPS configuration (e.g., a secondary SPS configuration). The secondary SPS configuration may include more resources for the downlink transmission (e.g., additional time/frequency resources, additional transmission repetitions, etc.). Thus, downlink transmissions sent and received via the secondary SPS configuration may be associated with higher reliability than downlink transmissions sent and received via the default SPS configuration. In some aspects, a base station may indicate to a group of UEs to utilize the secondary SPS configuration by a single DCI transmission (e.g., a group common-DCI (GC-DCI) transmission). By sending a single GC-DCI transmission to a group of UEs, the base station may decrease the control signaling overhead necessary to utilize the secondary SPS configuration when compared to sending separate DCI transmissions to each UE.

Each of the SPS configurations (e.g., the primary SPS configuration, the secondary SPS configuration) may be previously configured for multiple UEs (e.g., by radio resource control (RRC) signaling). In this regard, a UE may receive an RRC message including an indication of a first set of parameters associated with the primary SPS configuration, and a second set of parameters associated with the secondary SPS configuration. In some aspects, the first set of parameters associated with the primary SPS configuration may be associated with a first coverage level of a unicast channel for communications with a base station, and the second set of parameters associated with the secondary SPS configuration may be associated with a second coverage level of the unicast channel, where the second coverage level exhibits improved or enhanced performance as compared to the first coverage level.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to techniques for enhanced coverage semi-persistent scheduling.

FIG. 1 illustrates an example of a wireless communications system 100 that supports techniques for enhanced coverage SPS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, which may be in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a given receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit downlink transmissions to one or more of the UEs 115 according to SPS configurations. For example, the base station 105 may communicate (e.g., via an RRC message) a unique SPS configuration to each of the UEs 115. The base station 105 may transmit downlink transmissions to each of the UEs 115 according to the unique SPS configuration (e.g., via a set of unicast channels each associated with a narrow unicast beam). In some cases, a signal strength associated with a beam (or a set of adjacent beams) may become weak or suffer from partial shadowing. Thus, a reliability of the downlink transmissions to one or more of the UEs 115 may be adversely impacted. Here, the base station 105 may indicate a second SPS configuration to each of the UEs 115 impacted by the decreased signal strength, where the second SPS configurations may be associated with a different coverage level than the first SPS configurations (e.g., an enhanced coverage level).

The base station 105 may indicate the second SPS configurations by transmitting a DCI message to each of the UEs 115. For example, the base station 105 may transmit a single DCI message (e.g., a GC-DCI) to each of the UEs 115 indicating the second SPS configuration. Each UE 115 may identify a unique set of parameters associated with the second SPS configuration based on a previously received RRC message. That is, the base station 105 may indicate a second SPS configuration that is unique to each UE 115 by a single DCI message and each UE 115 may identify the unique second SPS configuration based on the DCI message. In some cases, a signaling overhead associated with indicating the second SPS configuration to each of the UEs 115 may be decreased by the base station 105 transmitting a single DCI message when compared to the base station 105 indicating the second SPS configuration to each of the UEs 115 individually. After transmitting the DCI message, the base station 105 may transmit downlink transmissions to the UEs 115 according to either the first SPS configuration or the second SPS configuration.

Figure 2:
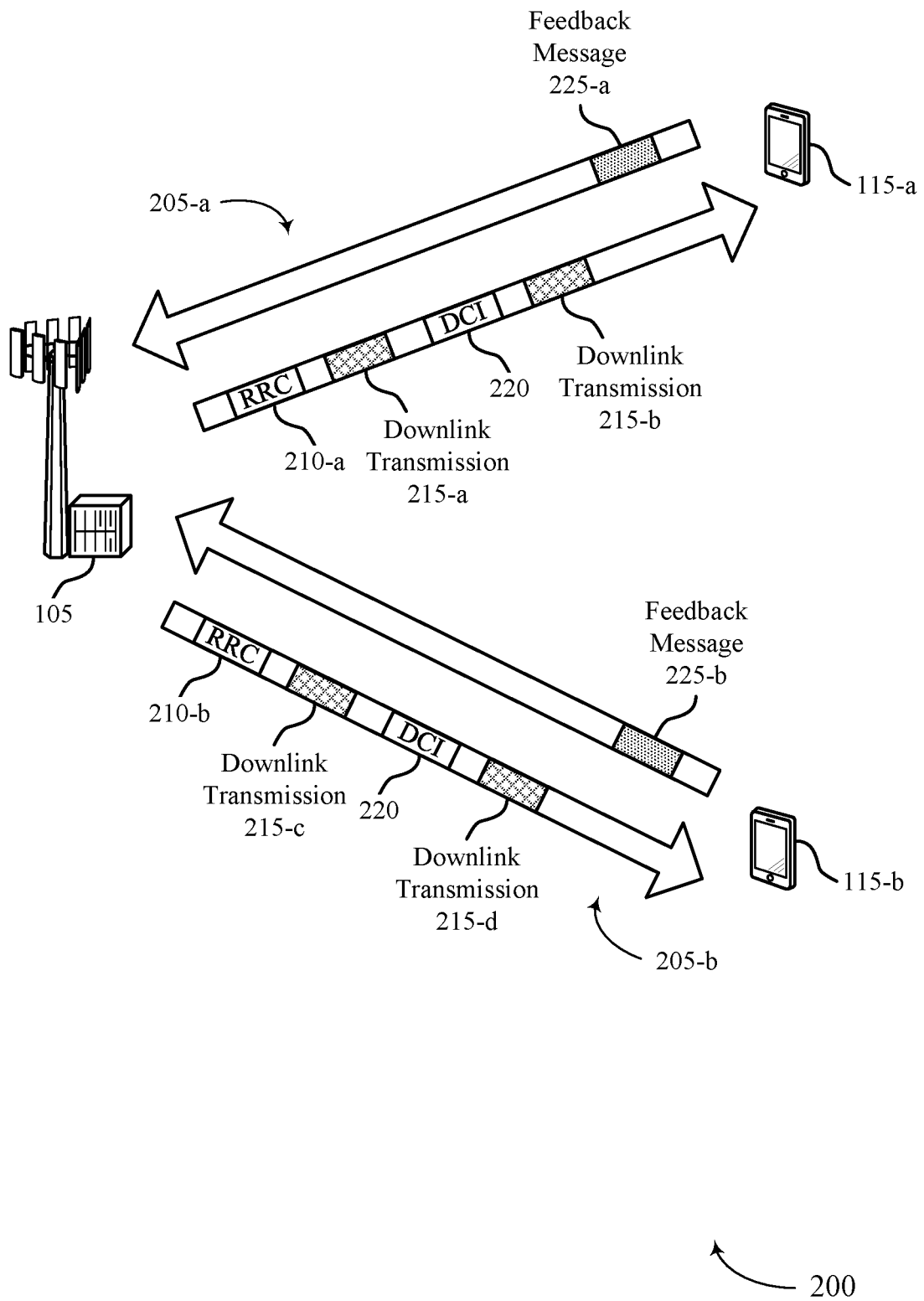
FIG. 2 illustrates an example of a wireless communications system that supports techniques for enhanced coverage SPS in accordance with aspects of the present disclosure.

FIG. 2 illustrates an example of a wireless communications system 200 that supports techniques for enhanced coverage SPS in accordance with aspects of the present disclosure. In some examples, wireless communications system 200 may implement aspects of wireless communications system 100. The wireless communications system 200 may include a base station 105, a first UE 115-a, and a second UE 115-b, which may be examples of base stations 105 and UEs 115, respectively, as described with reference to FIG. 1.

The first UE 115-a may communicate with the base station 105 using a first communication link 205-a, and the second UE 115-b may communicate with the base station 105 using a second communication link 205-b. In some cases, the first communication link 205-a and the second communication link 205-b may include examples of an access link (e.g., a Uu link). In some cases, the first communication link 205-a and the second communication link 205-b may include examples of a unicast channel between the base station 105 and the first UE 115-a and the second UE 115-b, respectively. The first communication link 205-a and the second communication link 205-b may include a bi-directional link that can include both uplink and downlink communication. For example, the first UE 115-a may transmit uplink transmissions, such as uplink control signals or uplink data signals, to the base station 105 using the first communication link 205-a and the base station 105 may transmit downlink transmissions 215, such as downlink control signals or downlink data signals, to the first UE 115-a using the first communication link 205-a. By way of another example, the second UE 115-b may transmit uplink transmissions, such as uplink control signals or uplink data signals, to the base station 105 using the second communication link 205-b and the base station 105 may transmit downlink transmissions 215, such as downlink control signals or downlink data signals, to the second UE 115-b using the second communication link 205-b.

The base station 105 may communicate downlink transmissions 215 to each of the UEs 115 according to one or more SPS configurations. The UEs 115 and the base stations 105 of the wireless communications system 200 may support communications which provide signaling to multiple UEs 115 (e.g., first UE 115-a and second UE 115-b) indicating the use of secondary SPS configurations (e.g., coverage-enhanced SPS configurations) without significantly increasing signaling overhead. In particular, the wireless communications system 200 may support a single common DCI 220 transmission (e.g., GC-DCI) to the first UE 115-a and the second UE 115-b which indicates for first UE 115-a and the second UE 115-b to utilize the secondary SPS configuration. By sending a single GC-DCI transmission (e.g., DCI 220) to a first UE 115-a and the second UE 115-b, the base station 105 may decrease the control signaling overhead necessary to utilize the secondary SPS configuration when compared to sending separate, individual DCI transmissions to each respective UE 115.

The base station 105 may indicate the parameters associated with the first SPS configuration, the second SPS configuration, or both to the first UE 115-a and the second UE 115-b. For example, the base station 105 may transmit an RRC message 210-a to the first UE 115-a indicating the second set of parameters associated with the second SPS configuration to be used by the first UE 115-a. By way of another example, the base station 105 may transmit an RRC message 210-b to the second UE 115-b indicating the second set of parameters associated with the second SPS configuration to be used by the second UE 115-b.

The second SPS configuration may be associated with different parameters when used by the first UE 115-a than when used by the second UE 115-b. For example, the base station 105 may transmit the RRC message 210-a to the first UE 115-a, where the RRC message 210-a includes an indication of a second set of parameters associated with the second SPS configuration. In this regard, the first UE 115-a may be preconfigured (e.g., configured via RRC message 210-a) to use the second set of parameters when utilizing the second SPS configuration. Additionally, the base station 105 may transmit the RRC message 210-b to the second UE 115-b, where the second RRC message 210-b includes an indication of a third set of parameters associated with the second SPS configuration, the third set of parameters different from the second set of parameters. In this regard, the second UE 115-b may be preconfigured (e.g., configured via RRC message 210-b) to use the third set of parameters when utilizing the second SPS configuration.

The first UE 115-a and the second UE 115-b may communicate with the base station 105 via the first communication link 205-a and the second communication link 205-b, respectively, using a first SPS configuration (e.g., default SPS configuration). In some aspects, the first SPS configuration may include a first set of parameters associated with a first coverage level of a unicast channel (e.g., first coverage level of the communication link 205-a). For example, the first UE 115-*a* may monitor the unicast channel associated with communication link 205-*a* for the first downlink transmission 215-*a* using the first SPS configuration. Additionally, the second UE 115-*b* may monitor the unicast channel associated with communication link 205-*b* for the first downlink transmission 215-*c* using the first SPS configuration. In some cases, a first set of parameters associated with the first SPS configuration used by the first UE 115-*a* may be different than a first set of parameters associated with the first SPS configuration used by the second UE 115-*b*.

In some cases, the base station 105 may identify sub-optimal performance of the unicast channels (e.g., first communication link 205-*a* and second communication link 205-*b*). For example, the performance of the unicast cannels associated with the first UE 115-*a*, the second UE 115-*b*, or both, may become weak or suffer from partial shadowing attributable to any number of factors including physical obstructions (e.g., a passing bus), weather conditions, noise, interference, or any combination thereof. The base station 105 may identify the sub-optimal performance of the unicast channels (e.g., first communication link 205-*a* and second communication link 205-*b*) based on measurements performed on uplink transmissions, measurement reports received from the first UE 115-*a* or the second UE 115-*b*, or both.

In order to improve performance over the unicast channels (e.g., first communication link 205-*a* and second communication link 205-*b*), the base station 105 may transmit a common DCI 220 to a set of UEs 115 including the first UE 115-*a* and the second UE 115-*b*. In some aspects, the common DCI 220 may include GC-DCI. For example, the base station 105 may transmit the common DCI 220 to the first UE 115-*a* via the first communication link 205-*a*, and may transmit the common DCI 220 to the second UE 115-*b* via the second communication link 205-*b*. In some aspects, the common DCI 220 includes an indication of a second SPS configuration different from the first SPS configuration. In some aspects, the indication of the second SPS configuration may be indicated in a bit field of the common DCI 220.

The second SPS configuration may include a second set of parameters associated with a second coverage level of the unicast channels (e.g., first communication link 205-*a* and second communication link 205-*b*), the second coverage level being different from the first coverage level. In some aspects, the second coverage level associated with the second SPS configuration is greater than the first coverage level. In this regard, the second SPS configuration may be associated with an improved or "coverage-enhanced" coverage level which is configured for more efficient and/or more reliable communications over the unicast channels (e.g., first communication link 205-*a* and second communication link 205-*b*).

In additional or alternative aspects, one or more parameters of the second SPS configuration may be indicated to the first UE 115-*a* and the second UE 115-*b* via the common DCI 220. For example, the base station 105 may transmit the common DCI 220 to the first UE 115-*a* and the second UE 115-*b*, where the common DCI 220 includes an indication of one or more parameters associated with the second SPS configuration. In this regard, the various parameters associated with the second SPS configuration may be signaled or indicated to the first UE 115-*a* and the second UE 115-*b* via the RRC message 210-*a*, the RRC message 210-*b*, the common DCI 220, or any combination thereof.

The base station 105 may transmit downlink transmissions 215 via the unicast channels (e.g., first communication link 205-*a* and second communication link 205-*b*) using the second SPS configuration based on receiving the DCI 220. For example, the first UE 115-*a* may monitor the unicast channel corresponding to the first communication link 205-*a* for the downlink transmission 215-*b* using the second SPS configuration based on receiving the DCI 220. Additionally, the base station 105 may transmit the downlink transmission 215-*b* according to the second SPS configuration based on transmitting the DCI 220. In another example, the second UE 115-*b* may monitor the unicast channel corresponding to the second communication link 205-*b* for the downlink transmission 215-*d* using the second SPS configuration and the base station 105 may transmit the downlink transmission 215-*d* according to the second SPS configuration. Additionally or alternatively, the first UE 115-*a* and the second UE 115-*b* may monitor the unicast channels for downlink transmission 215-*b* and downlink transmission 215-*d*, respectively, using the second SPS configuration based on receiving the RRC message 210-*a* and RRC message 210-*b* indicating the parameters associated with the second SPS configuration, the common DCI 220 indicating the parameters associated with the second SPS configuration, or any combination thereof.

In some cases, the indication of the second SPS configuration may be permissive rather than mandatory. In this regard, the indication of the second SPS configuration may indicate an option for the base station 105 to transmit a subsequent downlink transmission 215 according to the second SPS configuration. For example, the base station 105 may transmit the downlink transmission 215-*b* to the UE 115-*a* using the first SPS configuration, the second SPS configuration, or both SPS configurations. In this example, upon receiving the common DCI 220 the first UE 115-*a* may monitor the unicast channel corresponding to the first communication link 205-*a* using the first SPS configuration and using the second SPS configuration. Here, the first UE 115-*a* may attempt to blindly decode the downlink transmission 215-*b* using the first and second SPS configurations. In another example, the base station 105 may transmit the downlink transmission 215-*d* to the UE 115-*b* using the first SPS configuration, the second SPS configuration, or both SPS configurations. In this example, upon receiving the common DCI 220 the second UE 115-*a* may monitor the unicast channel corresponding to the first communication link 205-*b* using the first SPS configuration and using the second SPS configuration. Here, the second UE 115-*b* may attempt to blindly decode the downlink transmission 215-*d* using the first and second SPS configurations.

In some aspects, the sets of parameters (e.g., second set of parameters) associated with the second SPS configuration may be configured to enable more efficient and/or reliable downlink transmissions 215 over the unicast channels (e.g., first communication link 205-*a* and second communication link 205-*b*) as compared to the first set of parameters associated with the first SPS configuration. In this regard, the second set of parameters associated with the second SPS configuration may include a quantity of repetitions of downlink transmissions 215 when the base station 105 is transmitting the downlink transmissions 215 according to the second SPS configuration, a set of time resources, a set of frequency resources, a quantity of downlink transmission occasions allocated for the downlink transmissions 215 transmitting according to the second SPS configuration, or any combination thereof.

For example, the second SPS configuration may include additional (e.g., more) resources for the downlink transmissions 215 (e.g., additional time/frequency resources, additional transmission repetitions). For example, the base station 105 may transmit the first downlink transmission 215-*a* to the first UE 115-*a* using a first set of resources (e.g., first set of time resources, first set of frequency resources) associated with the first SPS configuration, and may transmit the second downlink transmission 215-*b* using a second set of resources (e.g., second set of time resources, second set of frequency resources) associated with the second SPS configuration, where the second set of resources is different from the first set of resources. In this example, the second set of resources may include additional time resources as compared to the first set of resources, additional frequency resources as compared to the first set of resources, or any combination thereof. By way of another example, the second set of resources associated with the second SPS configuration may include the first set of resources associated with the first SPS configuration and an additional set of resources. In some cases, the additional set of resources of the second SPS configuration may occupy consecutive slots following the first set of resources of the first SPS configuration.

In some aspects, the second set of resources associated with the second SPS configuration may include a larger quantity of repetitions of the downlink transmissions 215 as compared to the first set of resources associated with the first SPS configuration. For example, the base station 105 may transmit the first downlink transmission 215-*a* using a first quantity of repetitions associated with the first SPS configuration, and may transmit the second downlink transmission 215-*b* using a second quantity of repetitions associated with the second SPS configuration, where the second quantity of repetitions is different from (e.g., greater than) the first quantity of repetitions. In some aspects, repetitions of the second downlink transmission 215-*b* may be transmitted on consecutive slots following the first set of resources of the first SPS configuration.

In some aspects, the second set of parameters may additionally or alternatively include a set of resources (e.g., set of time resources, a set of frequency resources) associated with transmitting a feedback message 225 (e.g., an acknowledgement (ACK) message, a negative acknowledgement (NACK) message) to the base station 105 when using the second SPS configuration. The RRC message 210-*a*, the RRC message 210-*b*, the common DCI 220, or any combination thereof, may include an indication of the set of resources associated with the feedback message 225 to the base station 105 when using the second SPS configuration. In some aspects, the common DCI 220 may include an indication of an index associated with the set of resources for the feedback message 225-*a* to the base station 105, where indication of the index may indicate varying sets of resources for the feedback message 225-*a* from the first UE 115-*a* and for the feedback message 225-*b* from the second UE 115-*b*. In additional or alternative aspects, the set of resources associated with feedback message 225 may be based on a last repetition of the second downlink transmission 215-*b* or the second downlink transmission 215-*d* transmitted to the first UE 115-*a* or the second UE 115-*b*, respectively, according to the second SPS configuration.

By way of example, the base station 105 may transmit the RRC message 210-*a* and/or the common DCI 220 to the first UE 115-*a*, where the RRC message 210-*a* and/or the common DCI 220 includes an indication of a set of resources (e.g., set of time resources, a set of frequency resources) associated with the feedback message 225-*a* from the first UE 115-*a* when using the second SPS configuration. In this example, upon monitoring the unicast channel for the second downlink transmission 215-*b*, the first UE 115-*a* may transmit the feedback message 225-*a* indicating whether the first UE 115-*a* successfully decoded the downlink transmission 215-*b*. The first UE 115-*a* may transmit the feedback message 225-*a* using the set of resources associated with feedback for the second SPS configuration. Additionally, upon transmitting the second downlink transmission 215-*b*, the base station 105 may monitor the set of resources associated with feedback for the SPS configuration.

In some cases, the base station 105, the UEs 115, or both, may determine that the performance of the unicast channels (e.g., first communication link 205-*a* and second communication link 205-*b*) has improved, or may otherwise determine that the use of the second SPS configuration may be discontinued. For example, the base station 105 may determine improved performance of the unicast channel associated with the first UE 115-*a*, the unicast channel associated with the second UE 115-*b*, or both, based on measurements preformed on received uplink transmissions, measurement reports received from the first UE 115-*a* or the second UE 115-*a*, or any combination thereof. In this example, the base station 105 may transmit an additional DCI 220 (e.g., additional common DCI 220) to the first UE 115-*a*, the second UE 115-*b*, or both, where the additional DCI 220 includes an indication of the first SPS configuration. In some cases, the base station 105 may transmit the additional DCI 220 including the indication of the first SPS configuration based on the performed measurements or received measurement reports. In this example, the base station 105 may transmit downlink transmissions 215 according to the first SPS configuration and the first UE 115-*a* and the second UE 115-*b* may monitor the unicast channels using the first SPS configuration based on receiving the additional DCI 220.

Figure 3:
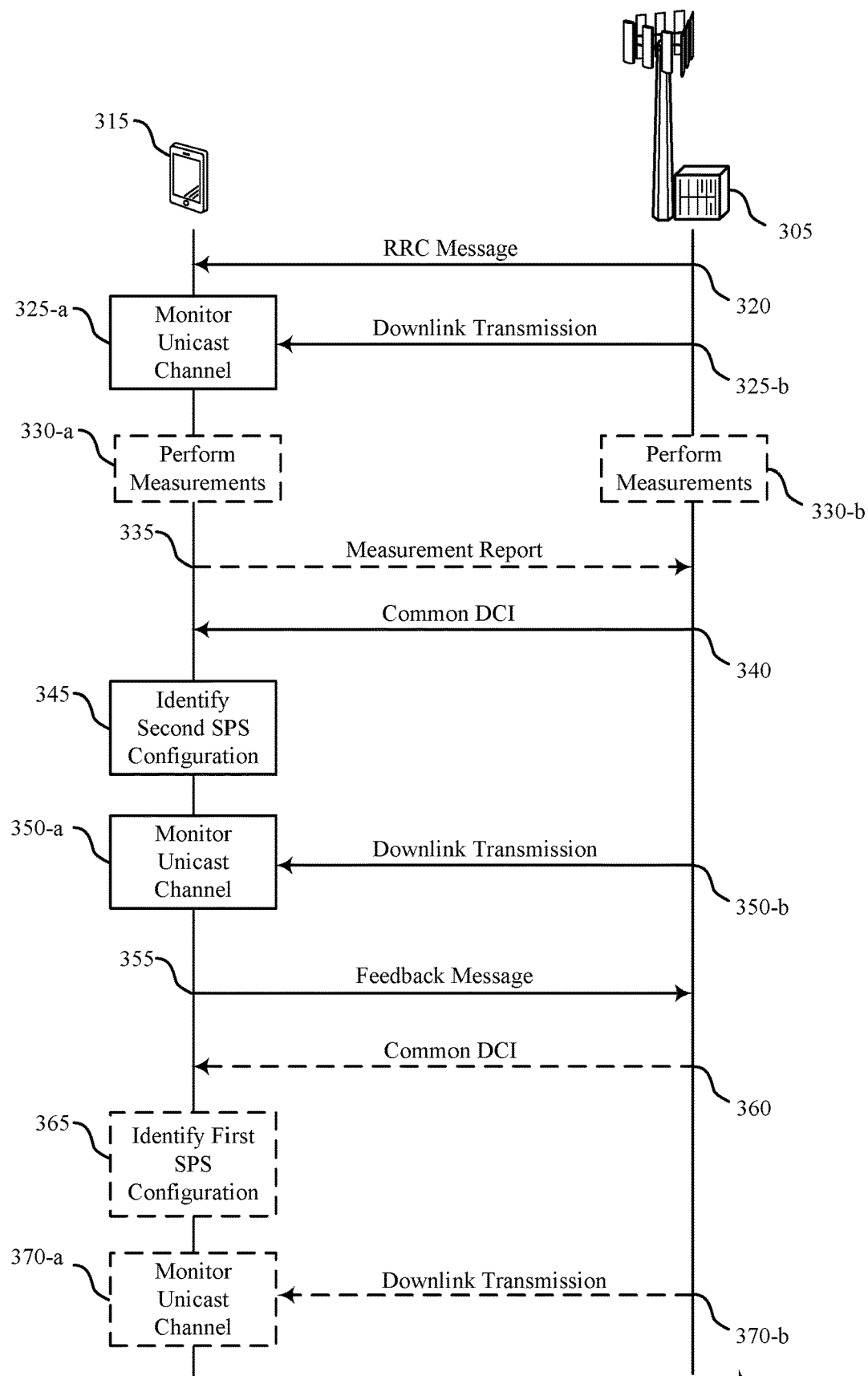
FIG. 3 illustrates an example of a process flow that supports techniques for enhanced coverage SPS in accordance with aspects of the present disclosure.

FIG. 3 illustrates an example of a process flow 300 that supports techniques for enhanced coverage SPS in accordance with aspects of the present disclosure. In some examples, the process flow 300 may implement aspects of wireless communications system 100 or wireless communications system 200. For example, the process flow 300 may illustrate the UE 315 monitoring a unicast channel using a first SPS configuration, receiving a common DCI including an indication of a second SPS configuration, and monitoring the unicast channel using the second SPS configuration, as described with reference to FIGS. 1-2, among other aspects.

In some cases, process flow 300 may be related to or be performed by a UE 315, a base station 305, or any combination thereof, which may be examples of corresponding devices as described herein. In particular, the UE 315 and base station 305 illustrated in FIG. 3 may include examples of the UEs 115 and base stations 105 illustrated in FIGS. 1 and 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 320, the base station 305 may transmit an RRC message including an indication of a first set of parameters associated with a first SPS configuration (e.g., a default SPS configuration), an indication of a second set of parameters associated with a second SPS configuration (e.g., a coverage-enhanced SPS configuration), or both. For example, in some cases, the base station 305 may transmit an RRC message to the UE 315, where the RRC message includes an indication of the second set of parameters associated with the second SPS configuration. In some cases, the RRC message may additionally include an indication of a set of resources for transmitting a feedback message according to the second SPS configuration.

At 325-a, the UE 315 may monitor a unicast channel using a first SPS configuration for a first downlink transmission from the base station 305. In some cases, the first SPS configuration may be associated with a first coverage level.

At 325-b, the base station 305 may transmit the first downlink transmission to the UE 315 according to the first SPS configuration.

At 330-a, the UE 315 may perform one or more measurements based on signals (e.g., transmissions) received from the base station 305 (e.g., the downlink transmission). For example, the UE 315 may perform one or more measurements on the reference signals received from the base station 305 (e.g., within the downlink transmission). Similarly, at 330-b, the base station 305 may perform one or more measurements based on signals (e.g., transmissions) received from the UE 315. The UE 315 and the base station 305 may be configured to measure any characteristics or parameters including an SNR, an SINR, a reference signal received power (RSRP) value, a reference signal received quality (RSRQ) value, or any combination thereof.

At 335, the UE 315 may transmit a measurement report to the base station 305. In some aspects, the UE 315 may transmit the measurement report based on the measurements performed at 330-a.

At 340, the base station 305 may transmit DCI that is common for a set of UEs (e.g., a GC-DCI). The DCI may indicate the second SPS configuration. In some cases, the second SPS configuration may be associated with a second coverage level different from the first coverage level. In some cases, the base station 305 may transmit the DCI to each UE within the set of UEs. Here, the DCI may indicate a second SPS configuration to each UE within the set of UEs.

At 345, the UE 315 may identify the second SPS configuration based on receiving the DCI (e.g., at 340) and the RRC message (e.g., at 320). In a case that the base station 305 transmits the DCI to a set of UEs, each of the UEs within the set of UEs may identify a unique second SPS configuration. That is, the UE 315 may identify a second SPS configuration that is different from a second configuration identified by a different UE within the set of UEs.

At 350-a, the UE 315 may monitor the unicast channel for a second downlink transmission from the base station 305 using the second SPS configuration including the second set of parameters associated with the second coverage level. In some cases, the UE 315 may additionally monitor the unicast channel for the second downlink transmission from the base station 305 using the first SPS configuration. That is, the UE 315 may attempt to decode the second downlink transmission based on the first SPS configuration and the second SPS configuration.

At 350-b, the base station 305 may transmit the second downlink transmission to the UE 315 according to the second SPS configuration.

At 355, the UE 315 may transmit a feedback message (e.g., and ACK/NACK message) to the base station 305 indicating whether a decoding of the second downlink transmission is successful. For example, if the UE 315 is unable to decode the second downlink transmission, the UE 315 may transmit a NACK message to the base station 305. Additionally, if the UE 315 is able to successfully decode the second downlink transmission, the UE 315 may transmit an ACK message to the base station 305. The UE 315 may identify a set of resources for transmitting the feedback message based on an indication within the DCI (e.g., received at 340) or the RRC message (e.g., received at 320). Additionally, the UE 315 may identify the set of resources for transmitting the feedback message based on a last repetition of the second downlink transmission. For example, the UE 315 may identify a first set of resources for transmitting the feedback message if the last repetition of the second downlink transmission is associated with one set of time and/or frequency resources. Additionally the UE 315 may identify a second set of resources for transmitting the feedback message if the last repetition of the second downlink transmission is associated with a different set of time and/or frequency resources. Additionally, at 355 the base station 305 may monitor a set of resources for the feedback message (e.g., based on an indication within the DCI, an indication within the RRC message, or a last repetition of the downlink transmission).

At 360, the base station 305 may transmit DCI to the UE 315, where the DCI includes an indication of the first SPS configuration. In some aspects, the DCI transmitted at 360 may include GC-DCI.

At 365, the UE 315 may identify (e.g., determine) the first SPS configuration and the first set of parameters associated with the first configured configuration. In some aspects, the UE 315 may identify the first SPS configuration based on receiving the DCI at 360.

At 370-a, the UE 315 may monitor the unicast channel for a third downlink transmission from the base station 305 using the first SPS configuration. For example, the UE 315 may monitor the unicast channel using the first set of parameters associated with the first SPS configuration. In some cases, the UE 315 may monitor the unicast channel using the first SPS configuration based on receiving the DCI indicating the first SPS configuration at 360, identifying the first SPS configuration at 365, or both.

At 370-b, the base station 305 may transmit the third downlink transmission to the UE 315 according to the first SPS configuration.

Figure 4:
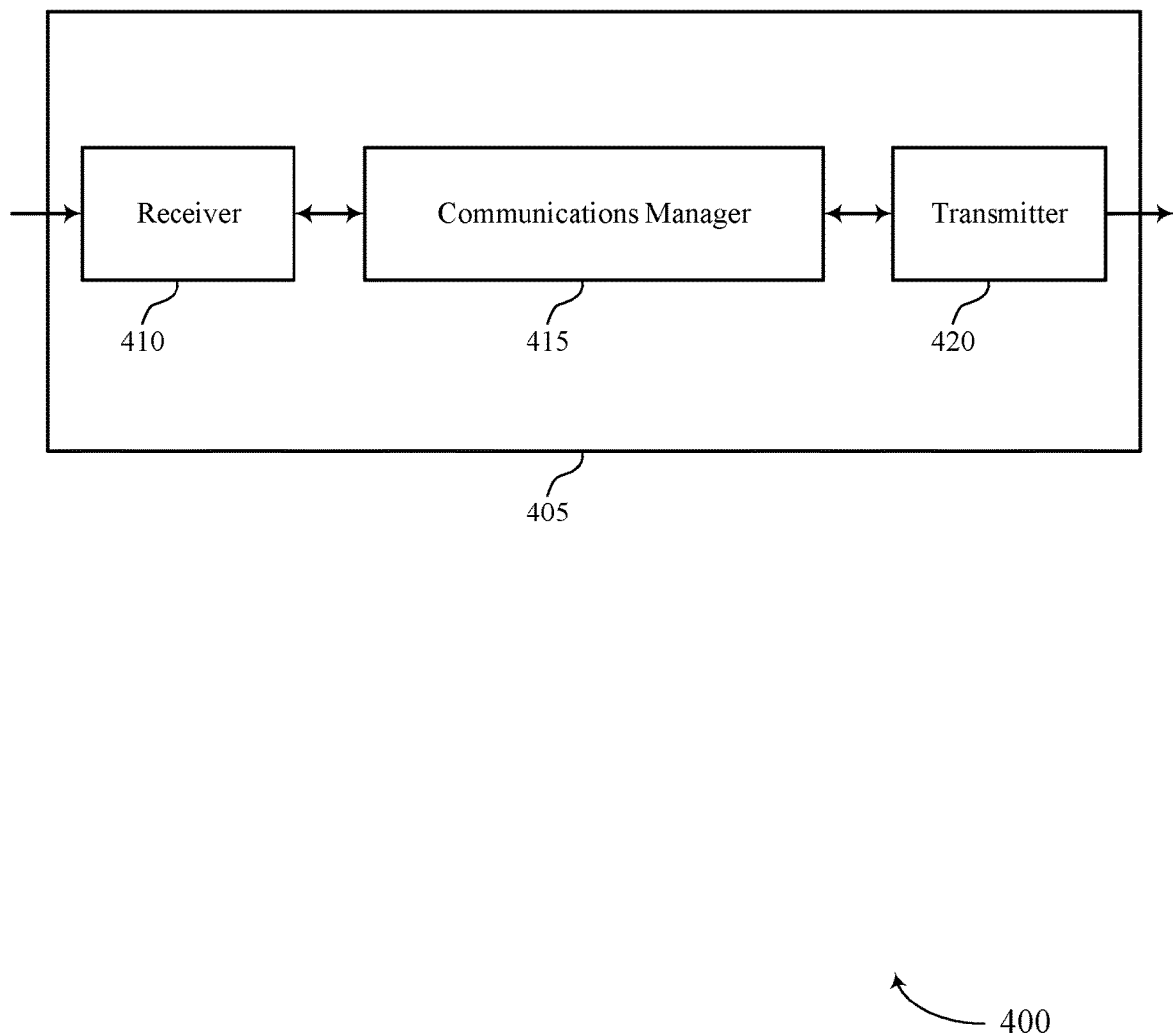
FIGS. 4 and 5 show block diagrams of devices that support techniques for enhanced coverage SPS in accordance with aspects of the present disclosure.

FIG. 4 shows a block diagram 400 of a device 405 that supports techniques for enhanced coverage SPS in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for enhanced coverage SPS, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may monitor a unicast channel using a first SPS configuration for a first downlink transmission from a base station, where the first SPS configuration includes a first set of parameters associated with a first coverage level, receive DCI that is common for a set of UEs, the DCI indicating a second SPS configuration different from the first SPS configuration, the second SPS configuration including a second set of parameters associated with a second coverage level of the unicast channel, the second coverage level being different from the first coverage level, and monitor the unicast channel for a second downlink transmission from the base station using the second SPS configuration including the second set of parameters associated with the second coverage level. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
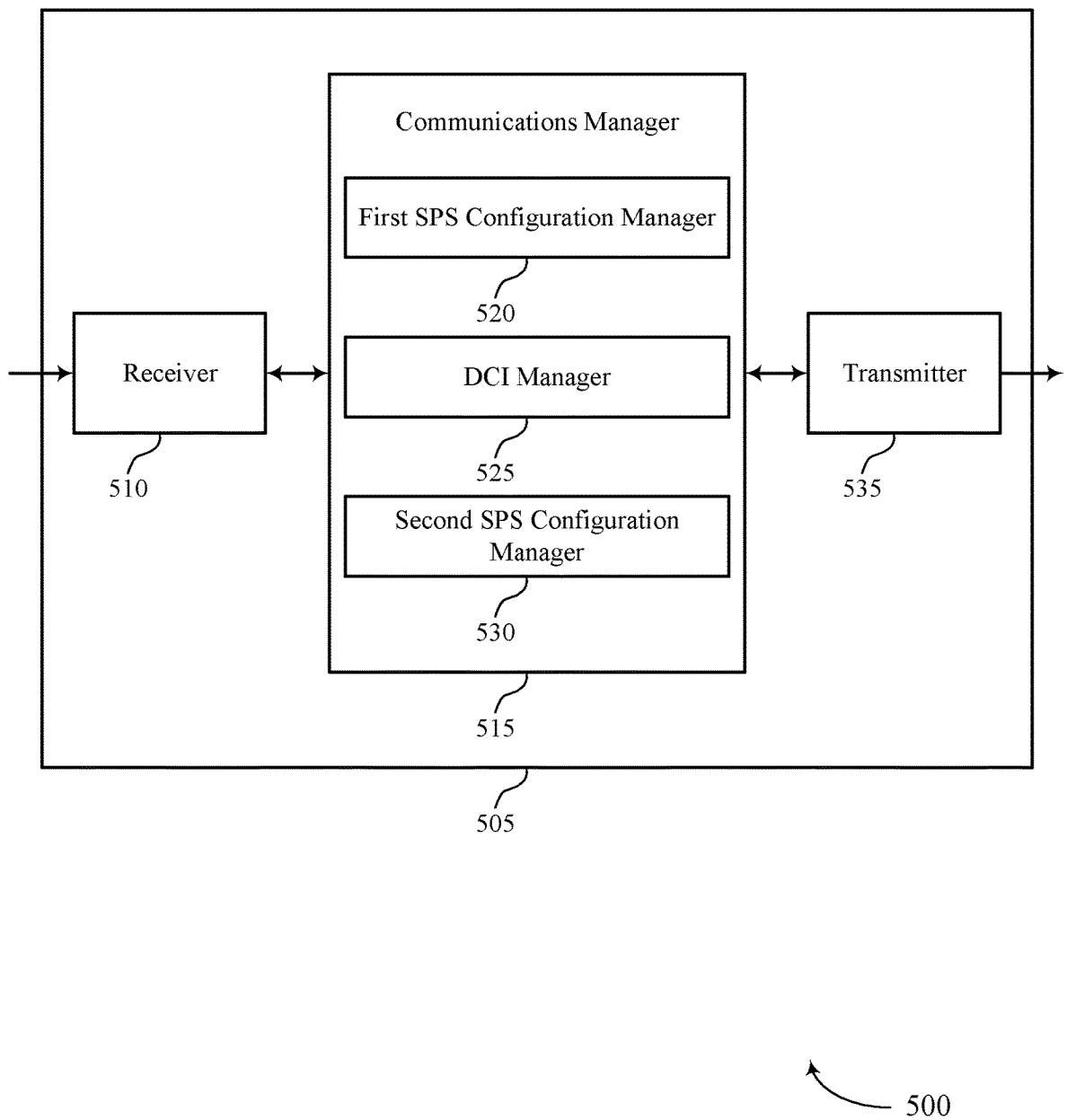

FIG. 5 shows a block diagram 500 of a device 505 that supports techniques for enhanced coverage SPS in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to techniques for enhanced coverage SPS, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a first SPS configuration manager 520, a DCI manager 525, and a second SPS configuration manager 530. The communications manager 515 may be an example of aspects of the communications manager 710 described herein.

The first SPS configuration manager 520 may monitor a unicast channel using a first SPS configuration for a first downlink transmission from a base station, where the first SPS configuration includes a first set of parameters associated with a first coverage level.

The DCI manager 525 may receive DCI that is common for a set of UEs, the DCI indicating a second SPS configuration different from the first SPS configuration, the second SPS configuration including a second set of parameters associated with a second coverage level of the unicast channel, the second coverage level being different from the first coverage level.

The second SPS configuration manager 530 may monitor the unicast channel for a second downlink transmission from the base station using the second SPS configuration including the second set of parameters associated with the second coverage level.

The transmitter 535 may transmit signals generated by other components of the device 505. In some examples, the transmitter 535 may be collocated with a receiver 510 in a transceiver component. For example, the transmitter 535 may be an example of aspects of the transceiver 720 described with reference to FIG. 7. The transmitter 535 may utilize a single antenna or a set of antennas.

Figure 6:
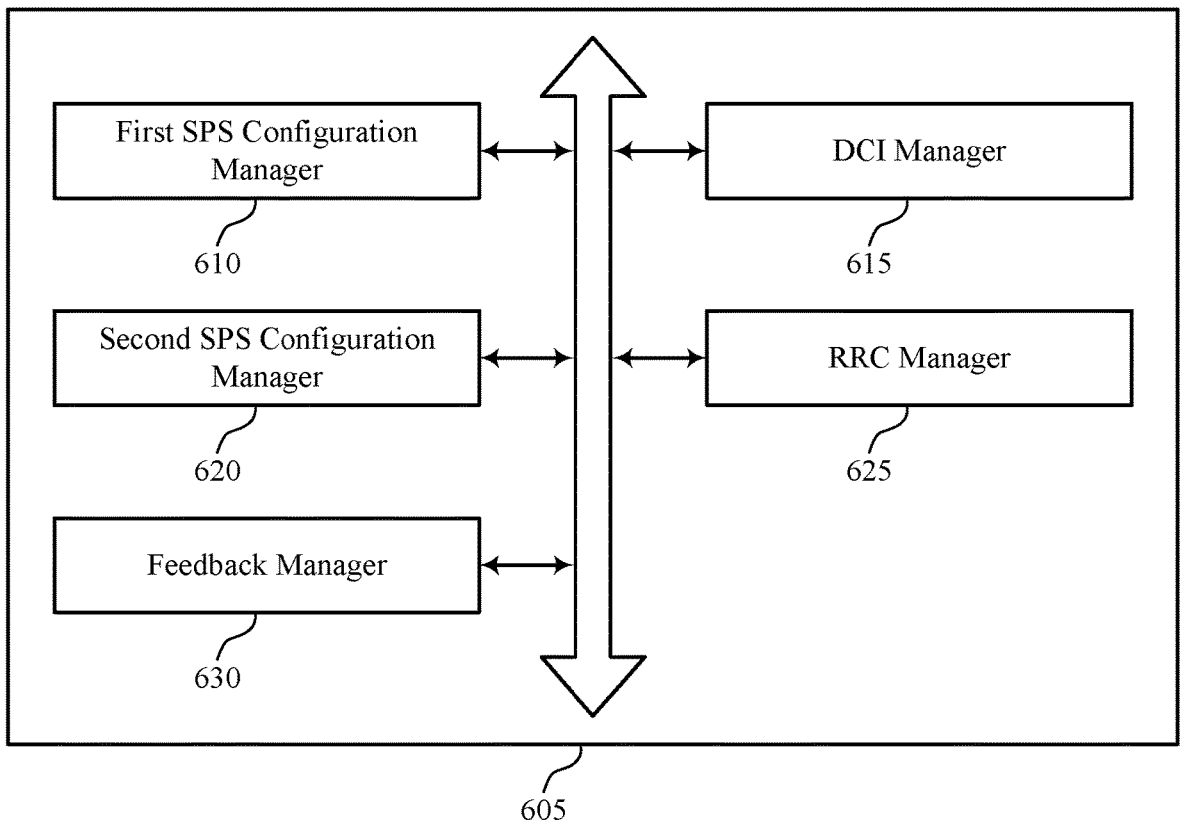
FIG. 6 shows a block diagram of a communications manager that supports techniques for enhanced coverage SPS in accordance with aspects of the present disclosure.

FIG. 6 shows a block diagram 600 of a communications manager 605 that supports techniques for enhanced coverage SPS in accordance with aspects of the present disclosure. The communications manager 605 may be an example of aspects of a communications manager 415, a communications manager 515, or a communications manager 710 described herein. The communications manager 605 may include a first SPS configuration manager 610, a DCI manager 615, a second SPS configuration manager 620, an RRC manager 625, and a feedback manager 630. Each of these components may communicate, directly or indirectly, with one another (e.g., via one or more buses).

The first SPS configuration manager 610 may monitor a unicast channel using a first SPS configuration for a first downlink transmission from a base station, where the first SPS configuration includes a first set of parameters associated with a first coverage level. In some examples, monitoring the unicast channel using the first SPS configuration includes monitoring for a first quantity of repetitions of the first downlink transmission. In some cases, monitoring the unicast channel using the first SPS configuration includes monitoring a first set of resources of the unicast channel for the first downlink transmission. In some examples, the first SPS configuration manager 610 may attempt to decode the second downlink transmission based on monitoring the unicast channel using the first SPS configuration.

The DCI manager 615 may receive DCI that is common for a set of UEs, the DCI indicating a second SPS configuration different from the first SPS configuration, the second SPS configuration including a second set of parameters associated with a second coverage level of the unicast channel, the second coverage level being different from the first coverage level. In some cases, the DCI includes the second set of parameters associated with the second SPS configuration. In some cases, the DCI includes a GC-DCI.

The second SPS configuration manager 620 may monitor the unicast channel for a second downlink transmission from the base station using the second SPS configuration including the second set of parameters associated with the second coverage level. In some examples, the second SPS configuration manager 620 may identify the second SPS configuration based on receiving the DCI and the RRC message, where monitoring the unicast channel according to the second SPS configuration is based on receiving the RRC message. In some examples, the second SPS configuration manager 620 may attempt to decode the second downlink transmission based on monitoring the unicast channel using the second SPS configuration. In some cases, the second SPS configuration manager 620 may receive the second downlink transmission based on monitoring the unicast channel using the second SPS configuration.

In some examples, monitoring the unicast channel using the second SPS configuration includes monitoring for a second quantity of repetitions of the second downlink transmission, the second quantity of repetitions being greater than the first quantity of repetitions. In some cases, monitoring the unicast channel using the second SPS configuration includes monitoring a second set of resources of the unicast channel for the first downlink transmission, where the second set of resources is different from the first set of resources. In some instances, the second SPS configuration manager 620 monitoring the unicast channel using the second SPS configuration is based on the DCI including the second set of parameters. In some examples, the second set of resources includes more time resources than the first set of resources, more frequency resources than the first set of resources, or a combination thereof. In some cases, the second set of resources includes at least the first set of resources.

The RRC manager 625 may receive, from the base station, an RRC message including an indication of the second set of parameters associated with the second SPS configuration, where monitoring the unicast channel using the second set of SPS configuration is based on receiving the RRC message. In some cases, the second set of parameters include a quantity of repetitions of the second downlink transmission, a set of time resources, a set of frequency resources, or a combination thereof.

The feedback manager 630 may transmit, to the base station via a set of resources, a feedback message indicating whether a decoding of the second downlink transmission is successful based on monitoring the unicast channel at the second coverage level associated with the second SPS configuration. In some cases, the feedback manager 630 may receive, from the base station, an RRC message indicating the set of resources, where transmitting the feedback message is based on receiving the RRC message. In some examples, the feedback manager 630 may identify the set of resources based on an indication within the DCI, where transmitting the feedback message is based on identifying the set of resources. In some instances, the feedback manager 630 may identify the set of resources based on a last repetition of the second downlink transmission, where transmitting the feedback message is based on identifying the set of resources.

Figure 7:
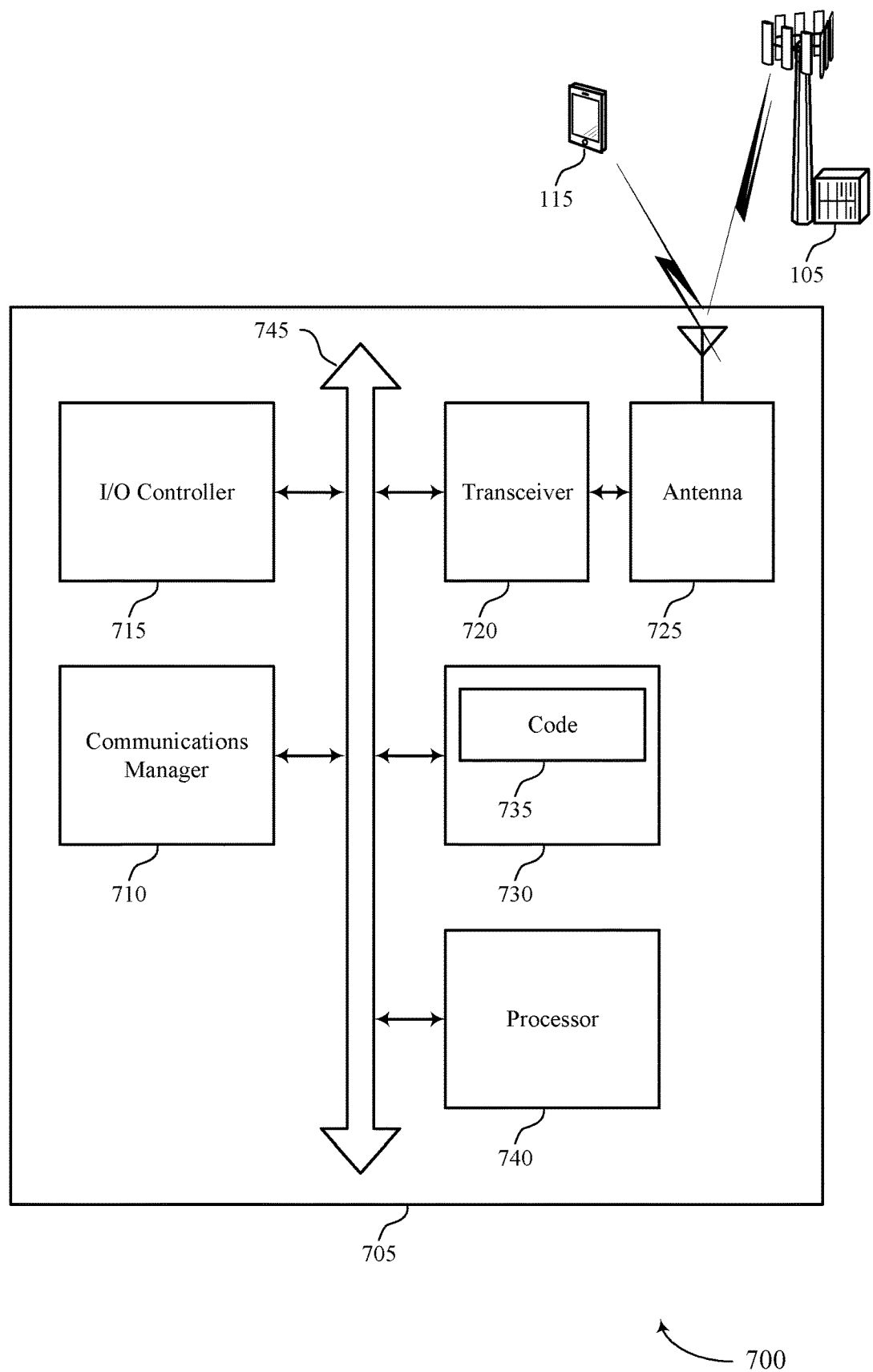
FIG. 7 shows a diagram of a system including a device that supports techniques for enhanced coverage SPS in accordance with aspects of the present disclosure.

FIG. 7 shows a diagram of a system 700 including a device 705 that supports techniques for enhanced coverage SPS in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may monitor a unicast channel using a first SPS configuration for a first downlink transmission from a base station, where the first SPS configuration includes a first set of parameters associated with a first coverage level, receive DCI that is common for a set of UEs, the DCI indicating a second SPS configuration different from the first SPS configuration, the second SPS configuration including a second set of parameters associated with a second coverage level of the unicast channel, the second coverage level being different from the first coverage level, and monitor the unicast channel for a second downlink transmission from the base station using the second SPS configuration including the second set of parameters associated with the second coverage level.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for enhanced coverage SPS).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
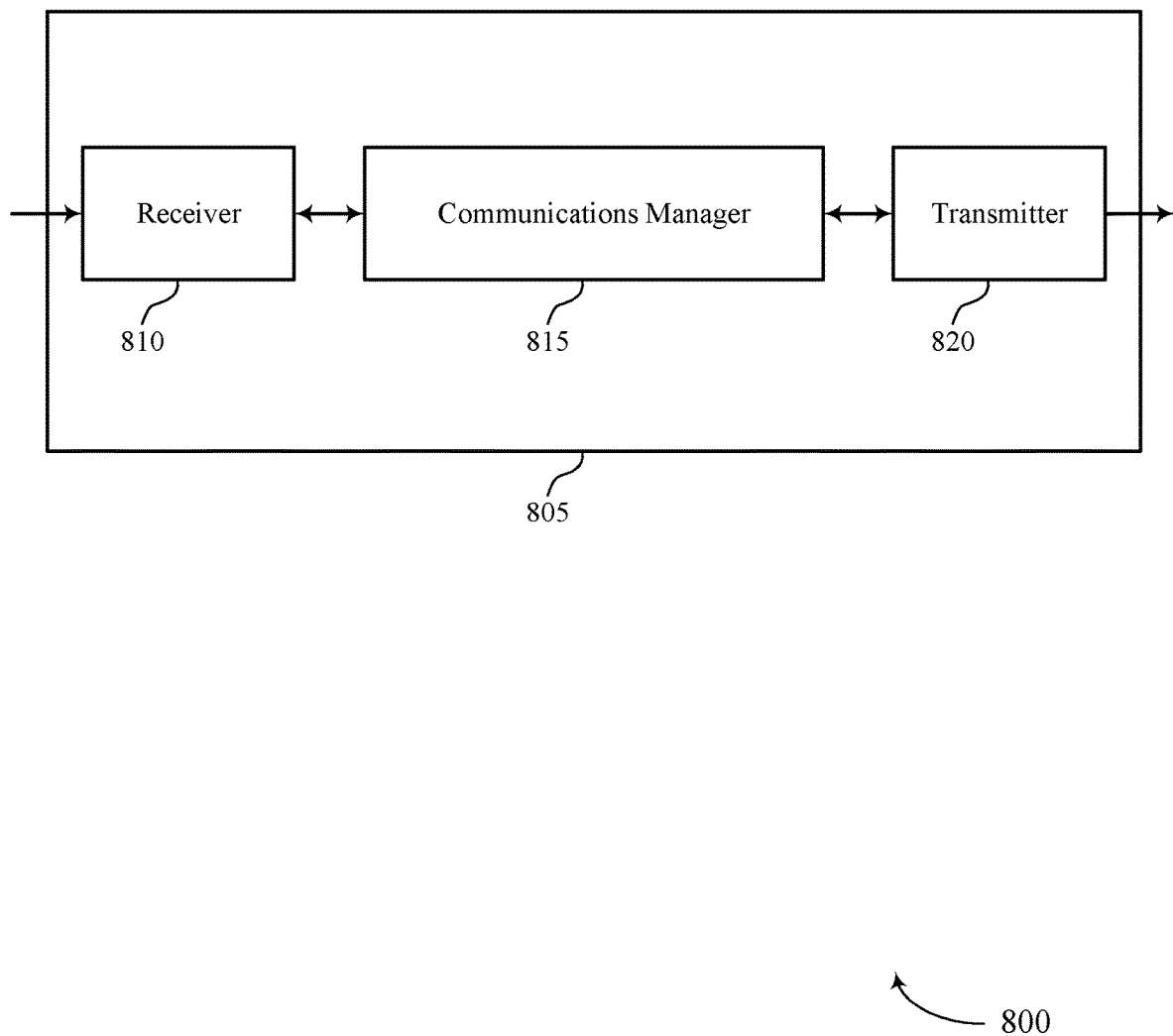
FIGS. 8 and 9 show block diagrams of devices that support techniques for enhanced coverage SPS in accordance with aspects of the present disclosure.

FIG. 8 shows a block diagram 800 of a device 805 that supports techniques for enhanced coverage SPS in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for enhanced coverage SPS, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, via a unicast channel, a first downlink transmission to a UE using a first SPS configuration, transmit, to a set of UEs including the UE, DCI that is common to the set of UEs, the DCI indicating a second SPS configuration different from the first SPS configuration, and transmit, via the unicast channel, a second downlink transmission to the UE according to the second SPS configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
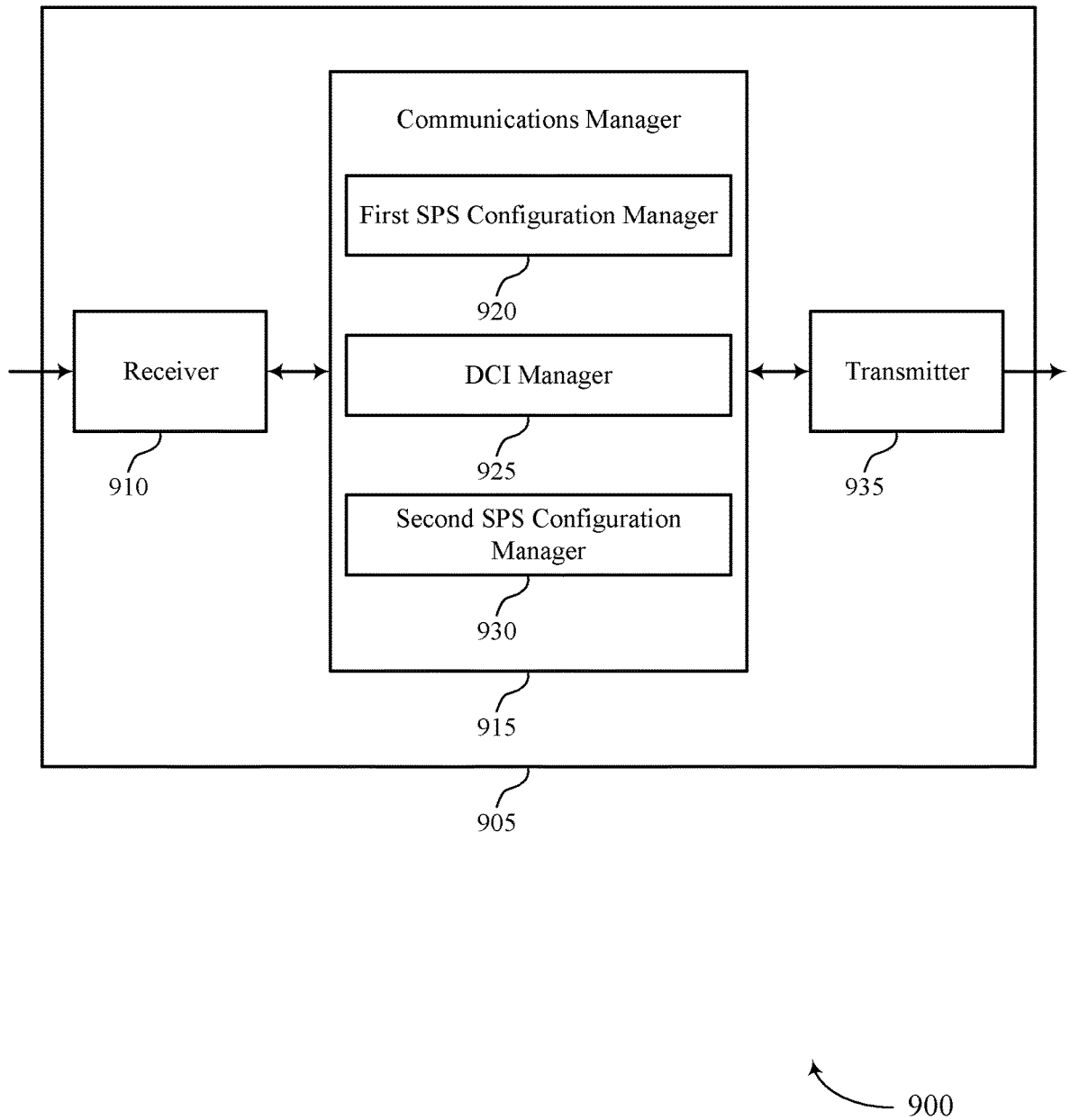

FIG. 9 shows a block diagram 900 of a device 905 that supports techniques for enhanced coverage SPS in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques for enhanced coverage SPS, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a first SPS configuration manager 920, a DCI manager 925, and a second SPS configuration manager 930. The communications manager 915 may be an example of aspects of the communications manager 1110 described herein.

The first SPS configuration manager 920 may transmit, via a unicast channel, a first downlink transmission to a UE using a first SPS configuration.

The DCI manager 925 may transmit, to a set of UEs including the UE, DCI that is common to the set of UEs, the DCI indicating a second SPS configuration different from the first SPS configuration.

The second SPS configuration manager 930 may transmit, via the unicast channel, a second downlink transmission to the UE according to the second SPS configuration.

The transmitter 935 may transmit signals generated by other components of the device 905. In some examples, the transmitter 935 may be collocated with a receiver 910 in a transceiver component. For example, the transmitter 935 may be an example of aspects of the transceiver 1120 described with reference to FIG. 11. The transmitter 935 may utilize a single antenna or a set of antennas.

Figure 10:
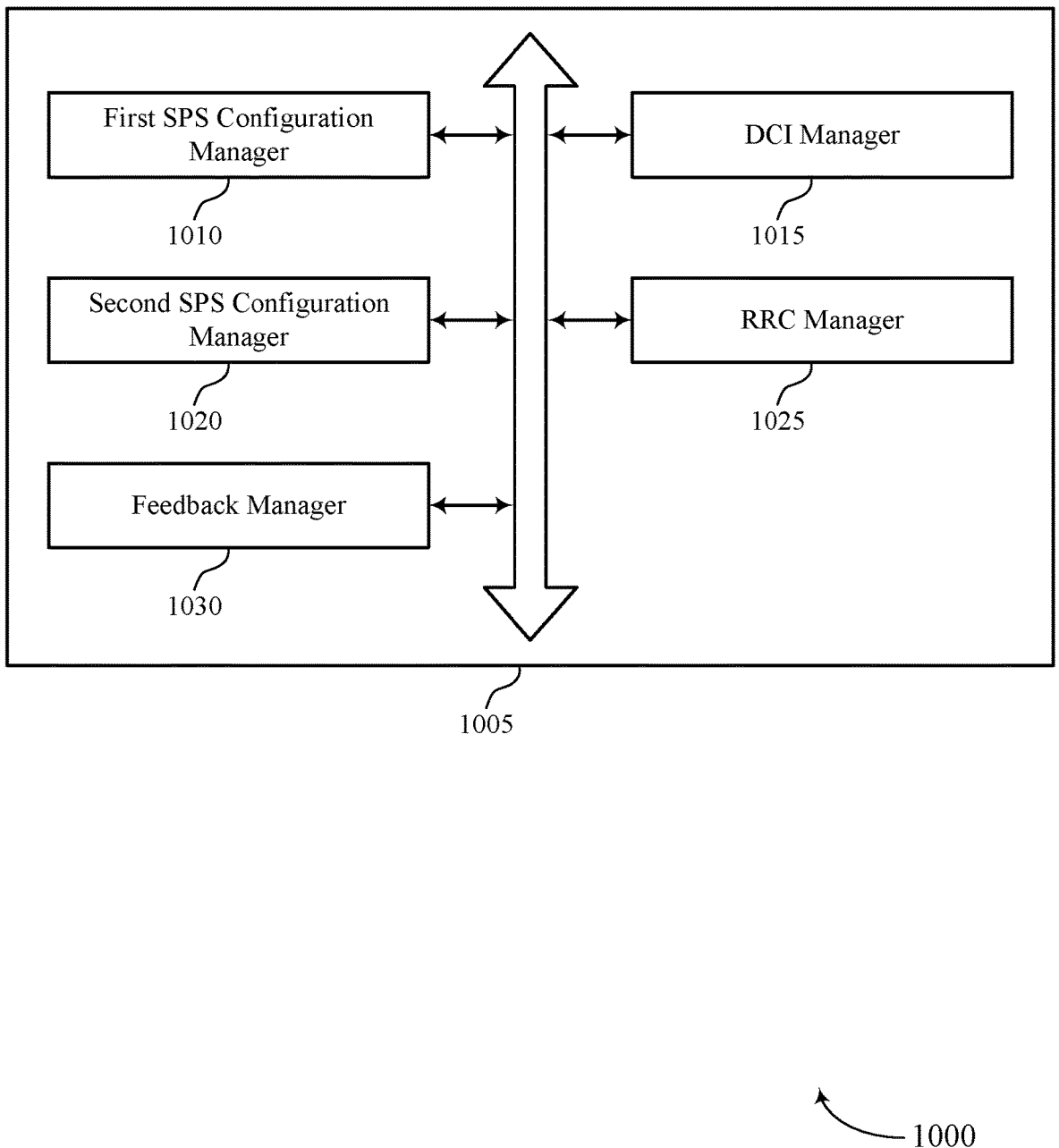
FIG. 10 shows a block diagram of a communications manager that supports techniques for enhanced coverage SPS in accordance with aspects of the present disclosure.

FIG. 10 shows a block diagram 1000 of a communications manager 1005 that supports techniques for enhanced coverage SPS in accordance with aspects of the present disclosure. The communications manager 1005 may be an example of aspects of a communications manager 815, a communications manager 915, or a communications manager 1110 described herein. The communications manager 1005 may include a first SPS configuration manager 1010, a DCI manager 1015, a second SPS configuration manager 1020, an RRC manager 1025, and a feedback manager 1030. Each of these components may communicate, directly or indirectly, with one another (e.g., via one or more buses).

The first SPS configuration manager 1010 may transmit, via a unicast channel, a first downlink transmission to a UE using a first SPS configuration. In some examples, transmitting the first downlink transmission to the UE according to the first SPS configuration includes transmitting a first quantity of repetitions of the first downlink transmission. In some cases, transmitting the first downlink transmission to the UE according to the first SPS configuration includes transmitting the first downlink transmission via a first set of resources of the unicast channel.

The DCI manager 1015 may transmit, to a set of UEs including the UE, DCI that is common to the set of UEs, the DCI indicating a second SPS configuration different from the first SPS configuration. In some examples, the DCI manager 1015 may indicate, to the UE, the set of resources associated with the feedback message by the DCI, where receiving a feedback message is based on indicating the set of resources to the UE. In some cases, the DCI manager 1015 may transmit a GC-DCI to the set of UEs, where the GC-DCI indicates a set of second SPS configurations unique to each UE within the set of UEs. In some cases, the DCI includes one or more parameters associated with the second SPS configuration.

The second SPS configuration manager 1020 may transmit, via the unicast channel, a second downlink transmission to the UE according to the second SPS configuration. In some examples, the second set of resources includes more time resources than the first set of resources, more frequency resources than the first set of resources, or both. In some cases, the second set of resources includes at least the first set of resources. In some examples, transmitting the second downlink transmission to the UE according to the second SPS configuration includes transmitting a second quantity of repetitions of the second downlink transmission greater than the first quantity of repetitions. In some cases, transmitting the second downlink transmission to the UE according to the second SPS configuration includes transmitting the second downlink transmission via a second set of resources of the unicast channel different than the first set of resources. In some instances, the second SPS configuration manager 1020 may transmit the second downlink transmission according to the second SPS configuration is based on the DCI including the one or more parameters.

The RRC manager 1025 may transmit, to the UE, an RRC message including an indication of one or more parameters associated with the second SPS configuration, where transmitting the first downlink transmission according to the first SPS configuration is based on receiving the RRC message. In some cases, the one or more parameters include a quantity of repetitions of the second downlink transmission, a set of time resources, a set of frequency resources, or a combination thereof. In some examples, the RRC manager 1025 may indicate the second SPS configuration to the UE based on transmitting the DCI and the RRC message, where transmitting the second downlink transmission to the UE according to the second SPS configuration is based on indicating the second SPS configuration to the UE. In some cases, the RRC manager 1025 may transmit, to the UE, an RRC message indicating the set of resources, where receiving a feedback message is based on indicating the set of resources to the UE.

The feedback manager 1030 may receive, from the UE via a set of resources, a feedback message indicating whether a decoding of the second downlink transmission is successful based on transmitting the second downlink transmission to the UE. In some examples, the feedback manager 1030 may indicate, to the UE, the set of resources associated with the feedback message based on transmitting a last repetition of the second downlink transmission, where receiving the feedback message is based on indicating the set of resources to the UE.

Figure 11:
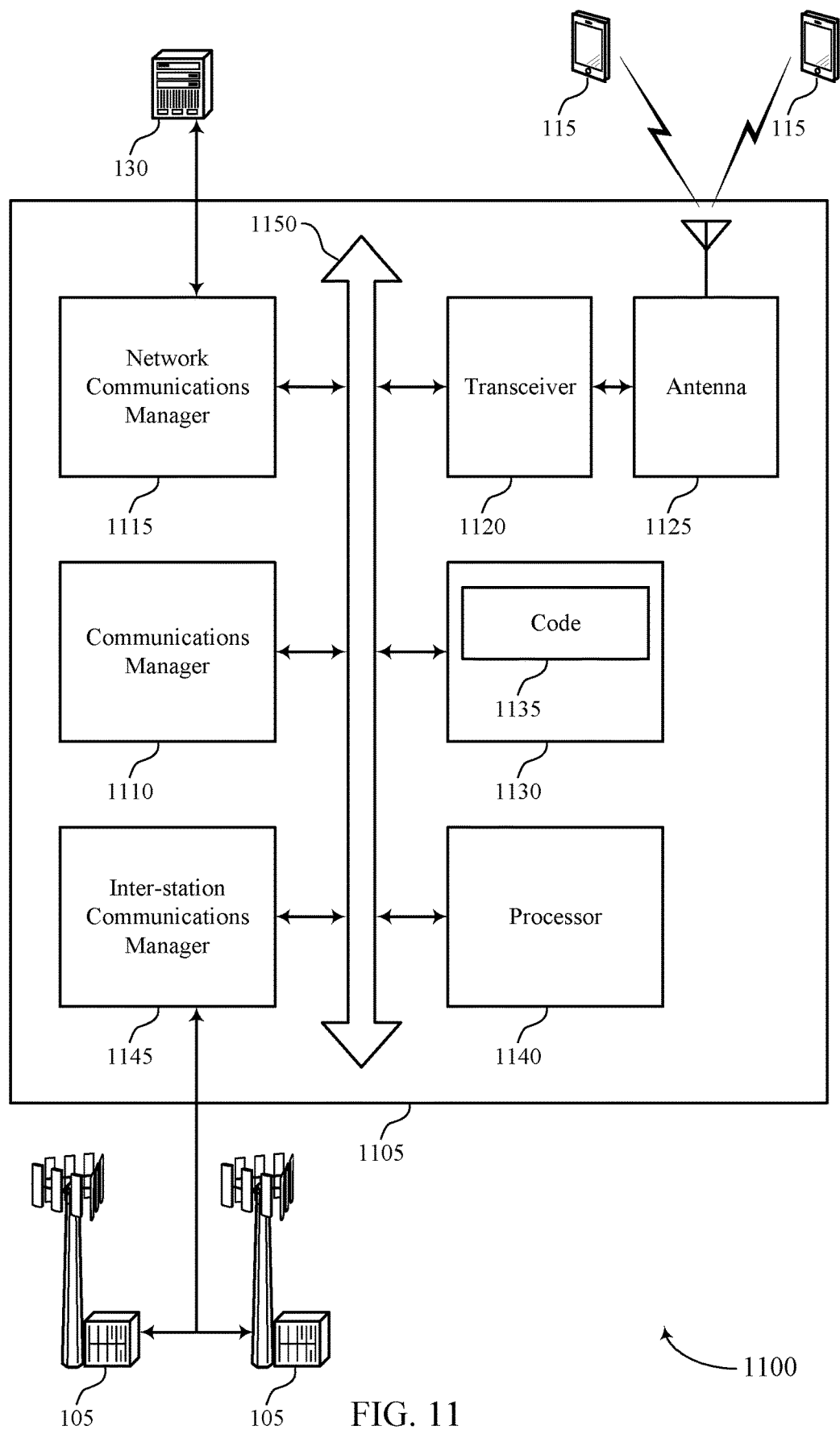
FIG. 11 shows a diagram of a system including a device that supports techniques for enhanced coverage SPS in accordance with aspects of the present disclosure.

FIG. 11 shows a diagram of a system 1100 including a device 1105 that supports techniques for enhanced coverage SPS in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, via a unicast channel, a first downlink transmission to a UE using a first SPS configuration, transmit, to a set of UEs including the UE, DCI that is common to the set of UEs, the DCI indicating a second SPS configuration different from the first SPS configuration, and transmit, via the unicast channel, a second downlink transmission to the UE according to the second SPS configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques for enhanced coverage SPS).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
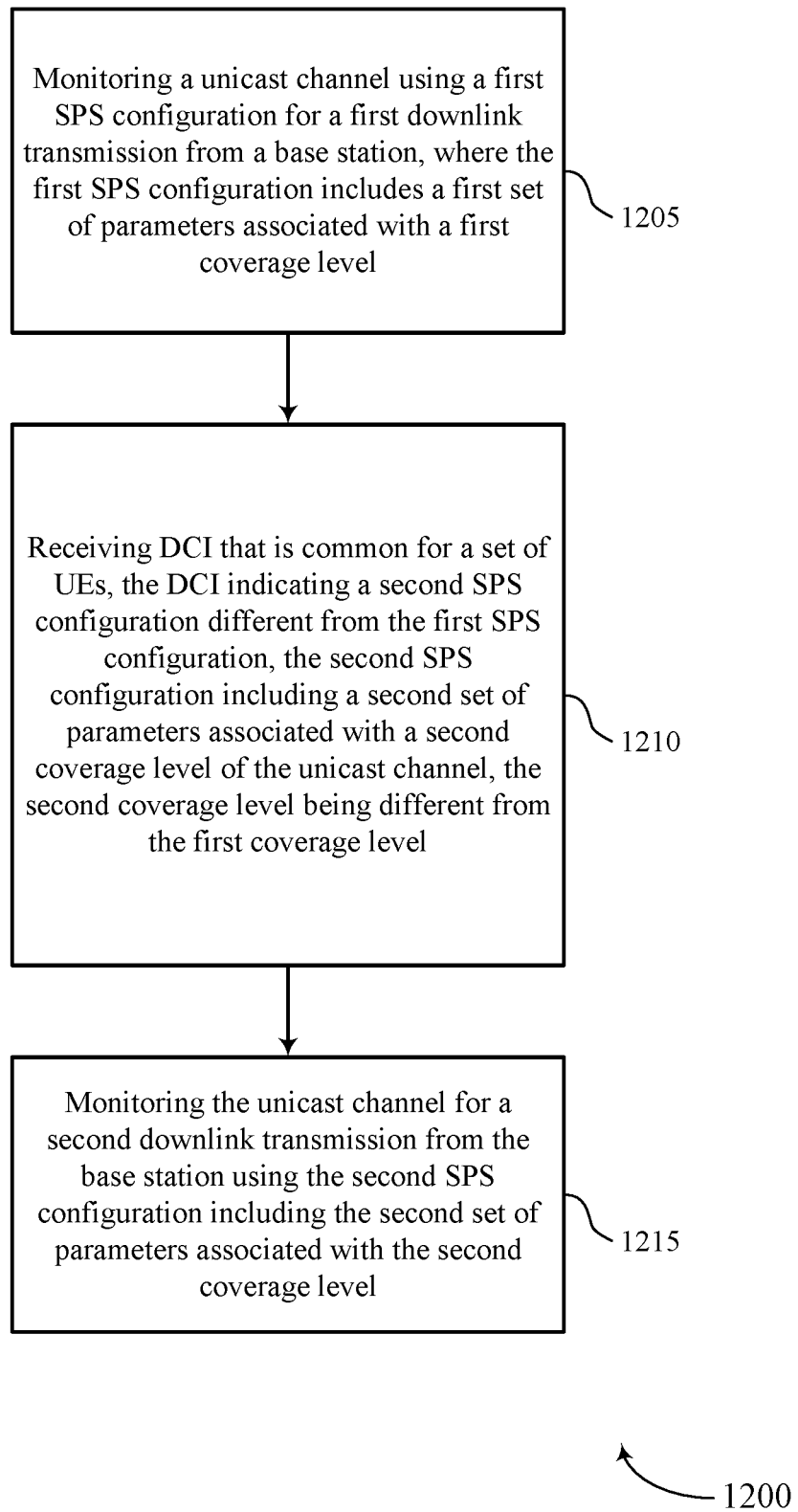
FIGS. 12 through 15 show flowcharts illustrating methods that support techniques for enhanced coverage SPS in accordance with aspects of the present disclosure.

FIG. 12 shows a flowchart illustrating a method 1200 that supports techniques for enhanced coverage SPS in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may monitor a unicast channel using a first SPS configuration for a first downlink transmission from a base station, where the first SPS configuration includes a first set of parameters associated with a first coverage level. The operations of 1205 may be performed according to the methods described herein. In some examples, aspects of the operations of 1205 may be performed by a first SPS configuration manager as described with reference to FIGS. 4 through 7.

At 1210, the UE may receive DCI that is common for a set of UEs, the DCI indicating a second SPS configuration different from the first SPS configuration, the second SPS configuration including a second set of parameters associated with a second coverage level of the unicast channel, the second coverage level being different from the first coverage level. The operations of 1210 may be performed according to the methods described herein. In some examples, aspects of the operations of 1210 may be performed by a DCI manager as described with reference to FIGS. 4 through 7.

At 1215, the UE may monitor the unicast channel for a second downlink transmission from the base station using the second SPS configuration including the second set of parameters associated with the second coverage level. The operations of 1215 may be performed according to the methods described herein. In some examples, aspects of the operations of 1215 may be performed by a second SPS configuration manager as described with reference to FIGS. 4 through 7.

Figure 13:
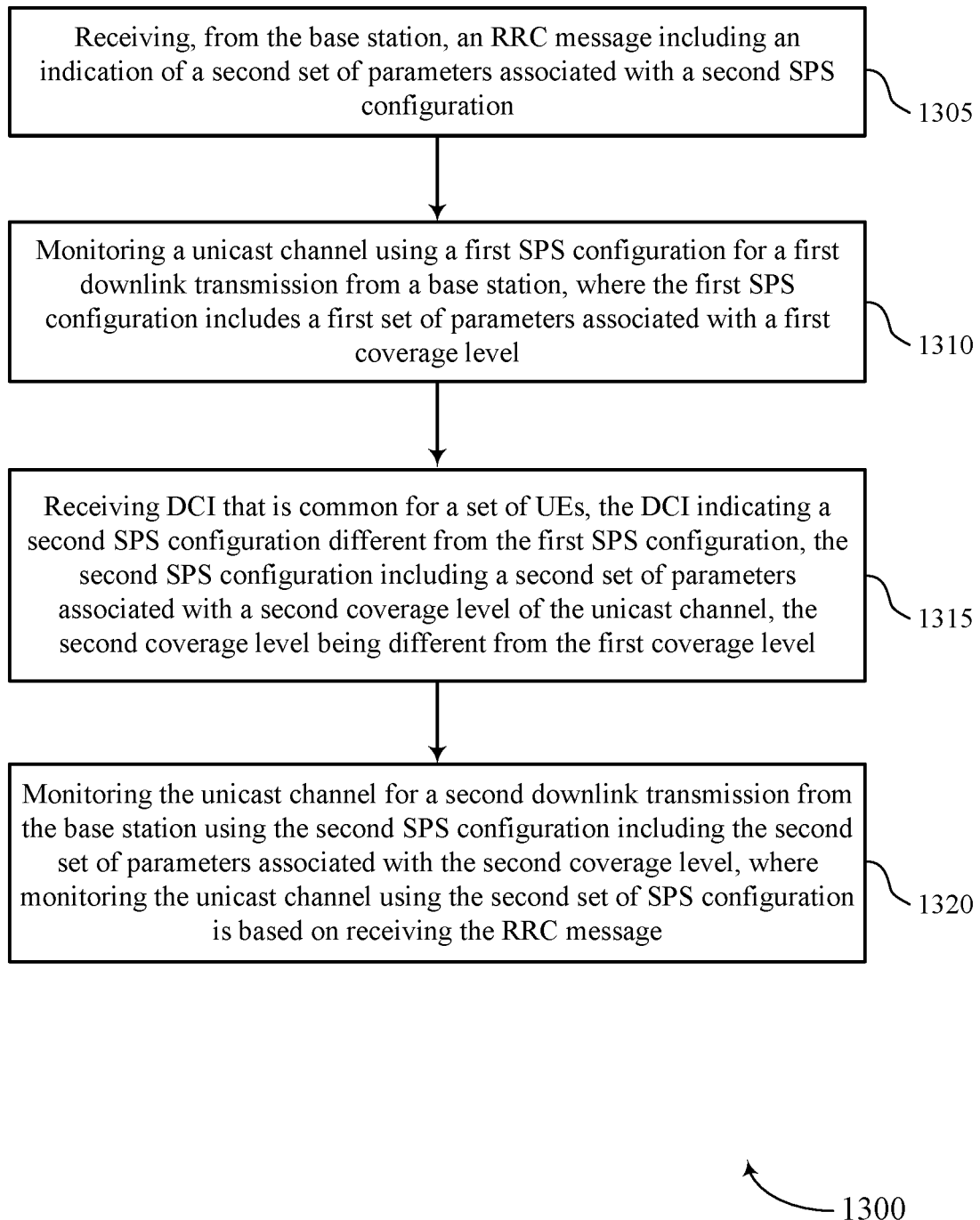

FIG. 13 shows a flowchart illustrating a method 1300 that supports techniques for enhanced coverage SPS in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive, from the base station, an RRC message including an indication of a second set of parameters associated with a second SPS configuration. The operations of 1305 may be performed according to the methods described herein. In some examples, aspects of the operations of 1305 may be performed by an RRC manager as described with reference to FIGS. 4 through 7.

At 1310, the UE may monitor a unicast channel using a first SPS configuration for a first downlink transmission from a base station, where the first SPS configuration includes a first set of parameters associated with a first coverage level. The operations of 1310 may be performed according to the methods described herein. In some examples, aspects of the operations of 1310 may be performed by a first SPS configuration manager as described with reference to FIGS. 4 through 7.

At 1315, the UE may receive DCI that is common for a set of UEs, the DCI indicating the second SPS configuration different from the first SPS configuration, the second SPS configuration including the second set of parameters associated with a second coverage level of the unicast channel, the second coverage level being different from the first coverage level. The operations of 1315 may be performed according to the methods described herein. In some examples, aspects of the operations of 1315 may be performed by a DCI manager as described with reference to FIGS. 4 through 7.

At 1320, the UE may monitor the unicast channel for a second downlink transmission from the base station using the second SPS configuration including the second set of parameters associated with the second coverage level, where monitoring the unicast channel using the second set of SPS configuration is based on receiving the RRC message The operations of 1320 may be performed according to the methods described herein. In some examples, aspects of the operations of 1320 may be performed by a second SPS configuration manager as described with reference to FIGS. 4 through 7.

Figure 14:
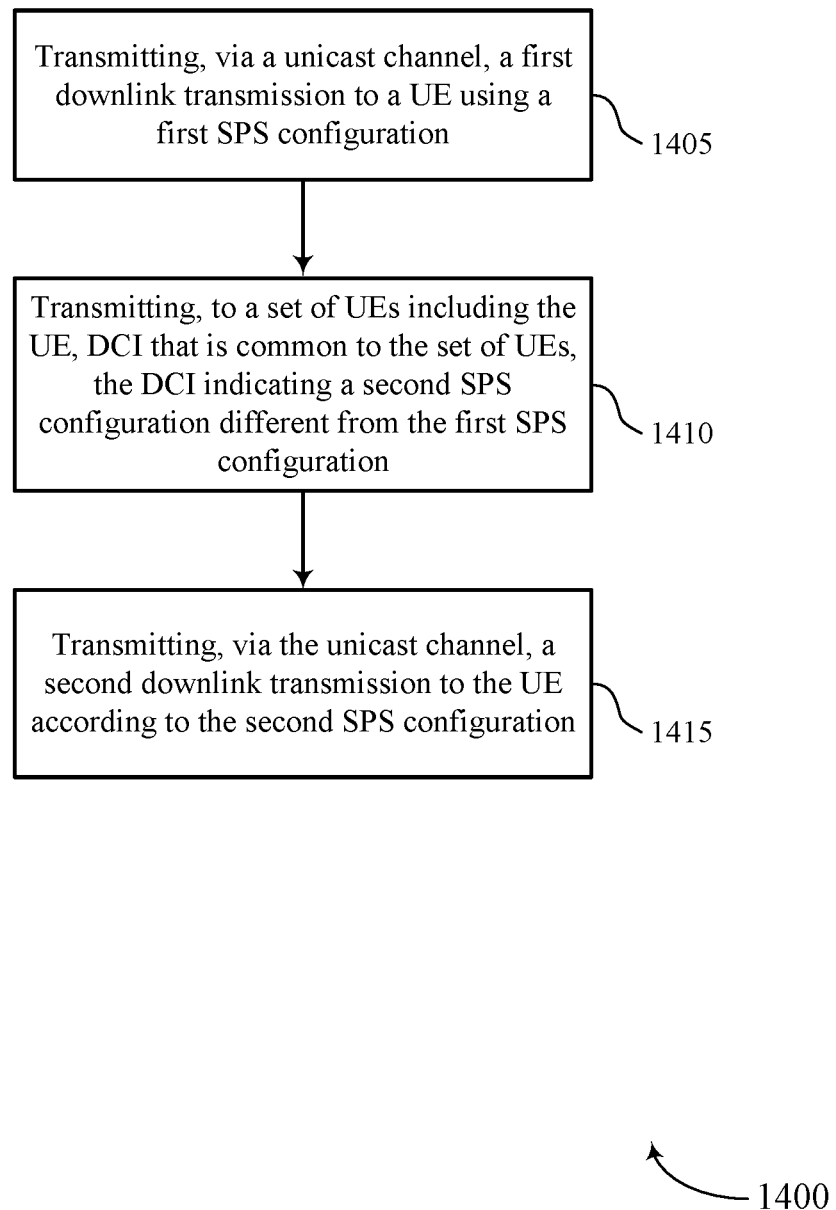

FIG. 14 shows a flowchart illustrating a method 1400 that supports techniques for enhanced coverage SPS in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may transmit, via a unicast channel, a first downlink transmission to a UE using a first SPS configuration. The operations of 1405 may be performed according to the methods described herein. In some examples, aspects of the operations of 1405 may be performed by a first SPS configuration manager as described with reference to FIGS. 8 through 11.

At 1410, the base station may transmit, to a set of UEs including the UE, DCI that is common to the set of UEs, the DCI indicating a second SPS configuration different from the first SPS configuration. The operations of 1410 may be performed according to the methods described herein. In some examples, aspects of the operations of 1410 may be performed by a DCI manager as described with reference to FIGS. 8 through 11.

At 1415, the base station may transmit, via the unicast channel, a second downlink transmission to the UE according to the second SPS configuration. The operations of 1415 may be performed according to the methods described herein. In some examples, aspects of the operations of 1415 may be performed by a second SPS configuration manager as described with reference to FIGS. 8 through 11.

Figure 15:
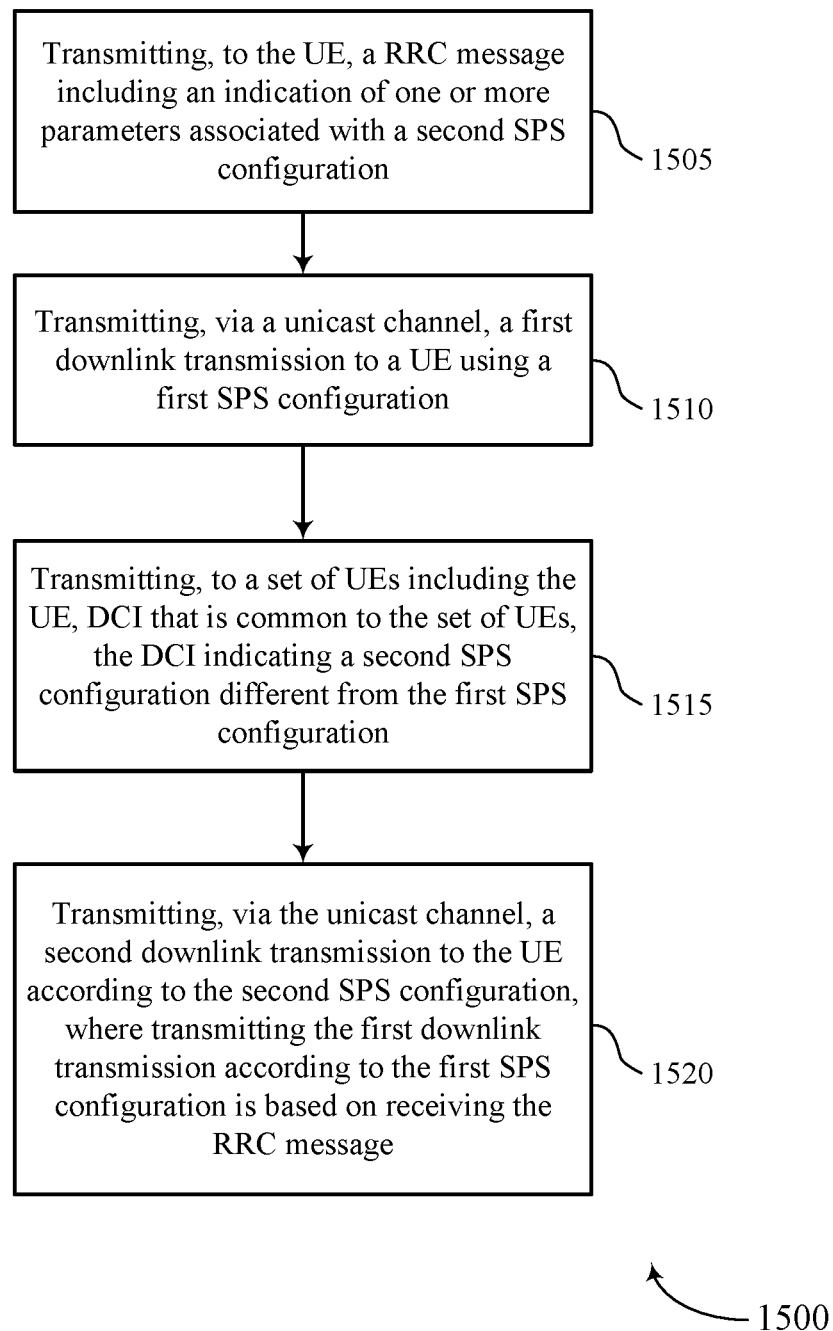

FIG. 15 shows a flowchart illustrating a method 1500 that supports techniques for enhanced coverage SPS in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may transmit, to the UE, an RRC message including an indication of one or more parameters associated with a second SPS configuration. The operations of 1505 may be performed according to the methods described herein. In some examples, aspects of the operations of 1505 may be performed by an RRC manager as described with reference to FIGS. 8 through 11.

At 1510, the base station may transmit, via a unicast channel, a first downlink transmission to a UE using a first SPS configuration. The operations of 1510 may be performed according to the methods described herein. In some examples, aspects of the operations of 1510 may be performed by a first SPS configuration manager as described with reference to FIGS. 8 through 11.

At 1515, the base station may transmit, to a set of UEs including the UE, DCI that is common to the set of UEs, the DCI indicating a second SPS configuration different from the first SPS configuration. The operations of 1515 may be performed according to the methods described herein. In some examples, aspects of the operations of 1515 may be performed by a DCI manager as described with reference to FIGS. 8 through 11.

At 1520, the base station may transmit, via the unicast channel, a second downlink transmission to the UE according to the second SPS configuration, where transmitting the first downlink transmission according to the first SPS configuration is based on receiving the RRC message. The operations of 1520 may be performed according to the methods described herein. In some examples, aspects of the operations of 1520 may be performed by a second SPS configuration manager as described with reference to FIGS. 8 through 11.

The following provides an overview of aspects of the present disclosure:

Aspect 1: A method for wireless communication at a UE, including: monitoring a unicast channel using a first SPS configuration for a first downlink transmission from a base station, where the first SPS configuration includes a first set of parameters associated with a first coverage level; receiving DCI that is common for a plurality of UEs, the DCI indicating a second SPS configuration different from the first SPS configuration, the second SPS configuration including a second set of parameters associated with a second coverage level of the unicast channel, the second coverage level being different from the first coverage level; and monitoring the unicast channel for a second downlink transmission from the base station using the second SPS configuration including the second set of parameters associated with the second coverage level.

Aspect 2: The method of aspect 1, further including: receiving, from the base station, a RRC message including an indication of the second set of parameters associated with the second SPS configuration, where monitoring the unicast channel using the second SPS configuration is based at least in part on receiving the RRC message.

Aspect 3: The method of aspect 2, further including: identifying the second SPS configuration based at least in part on receiving the DCI and the RRC message, where monitoring the unicast channel according to the second SPS configuration is based at least in part on receiving the RRC message.

Aspect 4: The method of any of aspects 2 through 3, where the second set of parameters comprise a quantity of repetitions of the second downlink transmission, a set of time resources, a set of frequency resources, or a combination thereof.

Aspect 5: The method of any of aspects 1 through 4, further including: monitoring the unicast channel using the first SPS configuration includes monitoring for a first quantity of repetitions of the first downlink transmission; and monitoring the unicast channel using the second SPS configuration includes monitoring for a second quantity of repetitions of the second downlink transmission, the second quantity of repetitions being greater than the first quantity of repetitions.

Aspect 6: The method of any of aspects 1 through 5, further including: monitoring the unicast channel using the first SPS configuration includes monitoring a first set of resources of the unicast channel for the first downlink transmission; and monitoring the unicast channel using the second SPS configuration includes monitoring a second set of resources of the unicast channel for the first downlink transmission, where the second set of resources is different from the first set of resources.

Aspect 7: The method of aspect 6, where the second set of resources includes more time resources than the first set of resources, more frequency resources than the first set of resources, or a combination thereof.

Aspect 8: The method of any of aspects 6 through 7, where the second set of resources includes at least the first set of resources.

Aspect 9: The method of any of aspects 1 through 8, further including: transmitting, to the base station via a set of resources, a feedback message indicating whether a decoding of the second downlink transmission is successful based at least in part on monitoring the unicast channel at the second coverage level associated with the second SPS configuration.

Aspect 10: The method of aspect 9, further including: identifying the set of resources based at least in part on an indication within the DCI, where transmitting the feedback message is based at least in part on identifying the set of resources.

Aspect 11: The method of any of aspects 9 through 10, further including: receiving, from the base station, a RRC message indicating the set of resources, where transmitting the feedback message is based at least in part on receiving the RRC message.

Aspect 12: The method of any of aspects 9 through 11, further including: identifying the set of resources based at least in part on a last repetition of the second downlink transmission, where transmitting the feedback message is based at least in part on identifying the set of resources.

Aspect 13: The method of any of aspects 1 through 12, where the DCI includes the second set of parameters associated with the second SPS configuration; and monitoring the unicast channel using the second SPS configuration is based at least in part on the DCI including the second set of parameters.

Aspect 14: The method of any of aspects 1 through 13, where monitoring the unicast channel for the second downlink transmission includes: monitoring the unicast channel using the first SPS configuration.

Aspect 15: The method of aspect 14, further including: attempting to decode the second downlink transmission based at least in part on monitoring the unicast channel using the first SPS configuration; and attempting to decode the second downlink transmission based at least in part on monitoring the unicast channel using the second SPS configuration.

Aspect 16: The method of any of aspects 1 through 15, further including: receiving the second downlink transmission based at least in part on monitoring the unicast channel using the second SPS configuration.

Aspect 17: The method of any of aspects 1 through 16, where the DCI includes a GC-DCI.

Aspect 18: A method for wireless communications at a base station, including: transmitting, via a unicast channel, a first downlink transmission to a UE using a first SPS configuration; transmitting, to a plurality of UEs including the UE, DCI that is common to the plurality of UEs, the DCI indicating a second SPS configuration different from the first SPS configuration; and transmitting, via the unicast channel, a second downlink transmission to the UE according to the second SPS configuration.

Aspect 19: The method of aspect 18, further including: transmitting, to the UE, a RRC message including an indication of one or more parameters associated with the second SPS configuration, where transmitting the first downlink transmission according to the first SPS configuration is based at least in part on receiving the RRC message.

Aspect 20: The method of aspect 19, where the one or more parameters comprise a quantity of repetitions of the second downlink transmission, a set of time resources, a set of frequency resources, or a combination thereof.

Aspect 21: The method of any of aspects 19 through 20, further including: indicating the second SPS configuration to the UE based at least in part on transmitting the DCI and the RRC message, where transmitting the second downlink transmission to the UE according to the second SPS configuration is based at least in part on indicating the second SPS configuration to the UE.

Aspect 22: The method of any of aspects 18 through 21, further including: transmitting the first downlink transmission to the UE according to the first SPS configuration includes transmitting a first quantity of repetitions of the first downlink transmission; and transmitting the second downlink transmission to the UE according to the second SPS configuration includes transmitting a second quantity of repetitions of the second downlink transmission greater than the first quantity of repetitions.

Aspect 23: The method of any of aspects 18 through 22, further including: transmitting the first downlink transmission to the UE according to the first SPS configuration includes transmitting the first downlink transmission via a first set of resources of the unicast channel; and transmitting the second downlink transmission to the UE according to the second SPS configuration includes transmitting the second downlink transmission via a second set of resources of the unicast channel different than the first set of resources.

Aspect 24: The method of aspect 23, where the second set of resources includes more time resources than the first set of resources, more frequency resources than the first set of resources, or both.

Aspect 25: The method of any of aspects 23 through 24, where the second set of resources includes at least the first set of resources.

Aspect 26: The method of any of aspects 18 through 25, further including: receiving, from the UE via a set of resources, a feedback message indicating whether a decoding of the second downlink transmission is successful based at least in part on transmitting the second downlink transmission to the UE.

Aspect 27: The method of aspect 26, further including: indicating, to the UE, the set of resources associated with the feedback message based at least in part on transmitting a last repetition of the second downlink transmission, where receiving the feedback message is based at least in part on indicating the set of resources to the UE.

Aspect 28: The method of any of aspects 18 through 27, where the DCI includes one or more parameters associated with the second SPS configuration; and transmitting the second downlink transmission according to the second SPS configuration is based at least in part on the DCI including the one or more parameters.

Aspect 29: An apparatus for wireless communication at a UE, including a processor; memory coupled with the processor; and instructions stored in the memory and executable by the processor to cause the apparatus to perform a method of any of aspects 1 through 17.

Aspect 30: An apparatus for wireless communication at a UE, including at least one means for performing a method of any of aspects 1 through 17.

Aspect 31: A non-transitory computer-readable medium storing code for wireless communication at a UE, the code including instructions executable by a processor to perform a method of any of aspects 1 through 17.

Aspect 32: An apparatus for wireless communications at a base station, including a processor; memory coupled with the processor; and instructions stored in the memory and executable by the processor to cause the apparatus to perform a method of any of aspects 18 through 28.

Aspect 33: An apparatus for wireless communications at a base station, including at least one means for performing a method of any of aspects 18 through 28.

Aspect 34: A non-transitory computer-readable medium storing code for wireless communications at a base station, the code including instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   monitoring a unicast channel using a first semi-persistent scheduling configuration for a first downlink transmission from a network entity, wherein the first semi-persistent scheduling configuration comprises a first set of parameters associated with a first coverage level;
   receiving, from the network entity, a radio resource control message comprising an indication of a second set of parameters associated with a second semi-persistent scheduling configuration different from the first semi-persistent scheduling configuration;
   receiving downlink control information that is common for a plurality of UEs, the downlink control information indicating the second semi-persistent scheduling configuration, the second semi-persistent scheduling configuration comprising the second set of parameters associated with a second coverage level of the unicast channel, the second coverage level being different from the first coverage level; and
   monitoring the unicast channel for a second downlink transmission from the network entity using the second semi-persistent scheduling configuration comprising the second set of parameters associated with the second coverage level.

2. The method of claim 1, further comprising:
identifying the second semi-persistent scheduling configuration based at least in part on receiving the downlink control information and the radio resource control message, wherein monitoring the unicast channel according to the second semi-persistent scheduling configuration is based at least in part on receiving the radio resource control message.

3. The method of claim 1, wherein the second set of parameters comprise a quantity of repetitions of the second downlink transmission, a set of time resources, a set of frequency resources, or a combination thereof.

4. The method of claim 1, wherein:
monitoring the unicast channel using the first semi-persistent scheduling configuration comprises monitoring for a first quantity of repetitions of the first downlink transmission; and
monitoring the unicast channel using the second semi-persistent scheduling configuration comprises monitoring for a second quantity of repetitions of the second downlink transmission, the second quantity of repetitions being greater than the first quantity of repetitions.

5. The method of claim 1, wherein:
monitoring the unicast channel using the first semi-persistent scheduling configuration comprises monitoring a first set of resources of the unicast channel for the first downlink transmission; and
monitoring the unicast channel using the second semi-persistent scheduling configuration comprises monitoring a second set of resources of the unicast channel for the first downlink transmission, wherein the second set of resources is different from the first set of resources.

6. The method of claim 5, wherein the second set of resources comprises more time resources than the first set of resources, more frequency resources than the first set of resources, or a combination thereof.

7. The method of claim 5, wherein the second set of resources comprises at least the first set of resources.

8. The method of claim 1, further comprising:
transmitting, to the network entity via a set of resources, a feedback message indicating whether a decoding of the second downlink transmission is successful based at least in part on monitoring the unicast channel at the second coverage level associated with the second semi-persistent scheduling configuration.

9. The method of claim 8, further comprising:
identifying the set of resources based at least in part on an indication within the downlink control information, wherein transmitting the feedback message is based at least in part on identifying the set of resources.

10. The method of claim 8, further comprising:
receiving, from the network entity, a radio resource control message indicating the set of resources, wherein transmitting the feedback message is based at least in part on receiving the radio resource control message.

11. The method of claim 8, further comprising:
identifying the set of resources based at least in part on a last repetition of the second downlink transmission, wherein transmitting the feedback message is based at least in part on identifying the set of resources.

12. The method of claim 1, wherein:
the downlink control information comprises the second set of parameters associated with the second semi-persistent scheduling configuration; and
monitoring the unicast channel using the second semi-persistent scheduling configuration is based at least in part on the downlink control information comprising the second set of parameters.

13. The method of claim 1, wherein monitoring the unicast channel for the second downlink transmission comprises:
monitoring the unicast channel using the first semi-persistent scheduling configuration.

14. The method of claim 13, further comprising:
attempting to decode the second downlink transmission based at least in part on monitoring the unicast channel using the first semi-persistent scheduling configuration; and
attempting to decode the second downlink transmission based at least in part on monitoring the unicast channel using the second semi-persistent scheduling configuration.

15. The method of claim 1, further comprising:
receiving the second downlink transmission based at least in part on monitoring the unicast channel using the second semi-persistent scheduling configuration.

16. The method of claim 1, wherein the downlink control information comprises a group-common downlink control information.

17. A method for wireless communication at a network entity, comprising:
transmitting, via a unicast channel, a first downlink transmission to a user equipment (UE) using a first semi-persistent scheduling configuration;
transmitting, to the UE, a radio resource control message comprising an indication of one or more parameters associated with a second semi-persistent scheduling configuration different from the first semi-persistent scheduling configuration;
transmitting, to a plurality of UEs including the UE, downlink control information that is common to the plurality of UEs, the downlink control information indicating the second semi-persistent scheduling configuration; and
transmitting, via the unicast channel, a second downlink transmission to the UE according to the second semi-persistent scheduling configuration.

18. The method of claim 17, wherein the one or more parameters comprise a quantity of repetitions of the second downlink transmission, a set of time resources, a set of frequency resources, or a combination thereof.

19. The method of claim 17, further comprising:
indicating the second semi-persistent scheduling configuration to the UE based at least in part on transmitting the downlink control information and the radio resource control message, wherein transmitting the second downlink transmission to the UE according to the second semi-persistent scheduling configuration is based at least in part on indicating the second semi-persistent scheduling configuration to the UE.

20. The method of claim 17, further comprising:
transmitting the first downlink transmission to the UE according to the first semi-persistent scheduling configuration comprises transmitting a first quantity of repetitions of the first downlink transmission; and
transmitting the second downlink transmission to the UE according to the second semi-persistent scheduling configuration comprises transmitting a second quantity of repetitions of the second downlink transmission greater than the first quantity of repetitions.

21. The method of claim 17, further comprising:
transmitting the first downlink transmission to the UE according to the first semi-persistent scheduling configuration comprises transmitting the first downlink transmission via a first set of resources of the unicast channel; and transmitting the second downlink transmission to the UE according to the second semi-persistent scheduling configuration comprises transmitting the second downlink transmission via a second set of resources of the unicast channel different than the first set of resources.

22. The method of claim 21, wherein the second set of resources comprises more time resources than the first set of resources, more frequency resources than the first set of resources, or both.

23. The method of claim 21, wherein the second set of resources comprises at least the first set of resources.

24. The method of claim 17, further comprising:
receiving, from the UE via a set of resources, a feedback message indicating whether a decoding of the second downlink transmission is successful based at least in part on transmitting the second downlink transmission to the UE.

25. The method of claim 24, further comprising:
indicating, to the UE, the set of resources associated with the feedback message based at least in part on transmitting a last repetition of the second downlink transmission, wherein receiving the feedback message is based at least in part on indicating the set of resources to the UE.

26. The method of claim 17, wherein:
the downlink control information comprises one or more parameters associated with the second semi-persistent scheduling configuration; and
transmitting the second downlink transmission according to the second semi-persistent scheduling configuration is based at least in part on the downlink control information comprising the one or more parameters.

27. An apparatus for wireless communication at a user equipment (UE), comprising:
a processor,
memory coupled with the processor; and
instructions stored in the memory and executable by the processor to cause the apparatus to:
monitor a unicast channel using a first semi-persistent scheduling configuration for a first downlink transmission from a network entity, wherein the first semi-persistent scheduling configuration comprises a first set of parameters associated with a first coverage level;
receive, from the network entity, a radio resource control message comprising an indication of a second set of parameters associated with a second semi-persistent scheduling configuration different from the first semi-persistent scheduling configuration;
receive downlink control information that is common for a plurality of UEs, the downlink control information indicating the second semi-persistent scheduling configuration, the second semi-persistent scheduling configuration comprising the second set of parameters associated with a second coverage level of the unicast channel, the second coverage level being different from the first coverage level; and
monitor the unicast channel for a second downlink transmission from the network entity using the second semi-persistent scheduling configuration comprising the second set of parameters associated with the second coverage level.

28. An apparatus for wireless communication at a network entity, comprising:
a processor,
memory coupled with the processor; and
instructions stored in the memory and executable by the processor to cause the apparatus to:
transmit, via a unicast channel, a first downlink transmission to a user equipment (UE) using a first semi-persistent scheduling configuration;
transmit, to the UE, a radio resource control message comprising an indication of one or more parameters associated with a second semi-persistent scheduling configuration different from the first semi-persistent scheduling configuration;
transmit, to a plurality of UEs including the UE, downlink control information that is common to the plurality of UEs, the downlink control information indicating the second semi-persistent scheduling configuration; and
transmit, via the unicast channel, a second downlink transmission to the UE according to the second semi-persistent scheduling configuration.

* * * * *